United States Patent
Bestler et al.

(10) Patent No.: US 9,385,874 B2
(45) Date of Patent: *Jul. 5, 2016

(54) SCALABLE TRANSPORT WITH CLIENT-CONSENSUS RENDEZVOUS

(71) Applicant: Nexenta Systems, Inc., Santa Clara, CA (US)

(72) Inventors: Caitlin Bestler, Sunnyvale, CA (US); Robert E. Novak, Union City, CA (US); Alexander Aizman, Santa Clara, CA (US)

(73) Assignee: Nexenta Systems, Inc., Santa Clara, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 14/095,848

(22) Filed: Dec. 3, 2013

(65) Prior Publication Data

US 2014/0207849 A1    Jul. 24, 2014

Related U.S. Application Data

(60) Provisional application No. 61/755,930, filed on Jan. 23, 2013, provisional application No. 61/844,262, filed on Jul. 9, 2013.

(51) Int. Cl.

| | |
|---|---|
| *G06F 15/16* | (2006.01) |
| *H04L 12/18* | (2006.01) |
| *H04L 29/08* | (2006.01) |

(Continued)

(52) U.S. Cl.
CPC ........ *H04L 12/18* (2013.01); *G06F 9/46* (2013.01); *G06F 17/30* (2013.01); *H04L 12/1854* (2013.01); *H04L 12/1877* (2013.01); *H04L 47/15* (2013.01); *H04L 67/1097* (2013.01); *H04L 69/164* (2013.01); *H04L 67/06* (2013.01)

(58) Field of Classification Search
CPC combination set(s) only.
See application file for complete search history.

(56) References Cited

U.S. PATENT DOCUMENTS

| | | |
|---|---|---|
| 5,561,807 A | 10/1996 | Verplanken et al. |
| 5,920,862 A | 7/1999 | Waters |

(Continued)

FOREIGN PATENT DOCUMENTS

| | | |
|---|---|---|
| EP | 1 387 296 A1 | 2/2004 |
| WO | 01/76140 A2 | 10/2001 |

OTHER PUBLICATIONS

International Search Report and Written Opinion of the International Searching Authority for Application No. PCT/US2014/012817, 13 sheets, Aug. 11, 2014.

*Primary Examiner* — Saket K Daftuar
(74) *Attorney, Agent, or Firm* — Okamoto & Benedicto LLP

(57) ABSTRACT

Embodiments disclosed herein provide advantageous methods and systems that use multicast communications via unreliable datagrams sent on a protected traffic class. These methods and systems provide effectively reliable multicast delivery while avoiding the overhead associated with point-to-point protocols. Rather than an exponential scaling of point-to-point connections (with expensive setup and teardown of the connections), the traffic from one server is bounded by linear scaling of multicast groups. In addition, the multicast rendezvous disclosed herein creates an edge-managed flow control that accounts for the dynamic state of the storage servers in the cluster, without needing centralized control, management or maintenance of state. This traffic shaping avoids the loss of data due to congestion during sustained oversubscription. Other embodiments, aspects and features are also disclosed.

21 Claims, 31 Drawing Sheets

(51) Int. Cl.
  *G06F 17/30* (2006.01)
  *H04L 29/06* (2006.01)
  *H04L 12/801* (2013.01)
  *G06F 9/46* (2006.01)

(56) References Cited

U.S. PATENT DOCUMENTS

| | | | |
|---|---|---|---|
| 6,038,592 | A | 3/2000 | Verplanken et al. |
| 6,557,111 | B1 | 4/2003 | Theimer et al. |
| 7,216,090 | B2 | 5/2007 | LaCroix |
| 7,990,962 | B2 | 8/2011 | Chang et al. |
| 8,307,087 | B1 * | 11/2012 | Patvarczki .......... H04L 67/1097 707/827 |
| 8,510,384 | B2 | 8/2013 | Yamauchi |
| 8,650,365 | B2 | 2/2014 | Bernbo et al. |
| 2002/0013948 | A1 | 1/2002 | Aguayo et al. |
| 2002/0078174 | A1 * | 6/2002 | Sim .................. G06F 17/30194 709/219 |
| 2003/0037158 | A1 | 2/2003 | Yano et al. |
| 2003/0074256 | A1 | 4/2003 | LaCroix |
| 2006/0075067 | A1 | 4/2006 | Blackmore et al. |
| 2006/0248252 | A1 | 11/2006 | Kharwa |
| 2007/0198356 | A1 | 8/2007 | LaCroix |
| 2007/0233626 | A1 | 10/2007 | Rupp et al. |
| 2009/0138532 | A1 | 5/2009 | Yamato |
| 2010/0106779 | A1 | 4/2010 | Yamauchi |
| 2011/0295807 | A1 * | 12/2011 | Bernbo ............... G06F 11/1662 707/634 |
| 2012/0023179 | A1 | 1/2012 | Bernbo et al. |
| 2012/0030170 | A1 | 2/2012 | Bernbo et al. |
| 2012/0084383 | A1 | 4/2012 | Bernbo et al. |
| 2012/0105905 | A1 | 5/2012 | Wei et al. |
| 2012/0284757 | A1 | 11/2012 | Rajapakse |
| 2012/0321052 | A1 | 12/2012 | Morrill et al. |
| 2013/0041872 | A1 * | 2/2013 | Aizman ............ G06F 17/30194 707/690 |
| 2013/0060804 | A1 | 3/2013 | Bernbo et al. |
| 2013/0060884 | A1 | 3/2013 | Bernbo et al. |
| 2013/0061232 | A1 | 3/2013 | Bernbo et al. |

* cited by examiner

Named Chunk Put Proposal Message

| Named Chunk Put Message |
|---|
| Total # of Fragments in Message |
| Target Negotiating Group |
| Content Hash ID |
| Bucket Hash ID |
| Name Hash ID |
| Unique Version Identifier |
| Length of non-volatile content |
| Length of above included in the Put Proposal message. |
| Delivery Group |
| Maximum Delivery Rate |

(Name spans Bucket Hash ID, Name Hash ID, Unique Version Identifier)

Unnamed Chunk Put Proposal Message

| Unnamed Chunk Put Message |
|---|
| Total # of Fragments in Message |
| Target Negotiating Group |
| Content Hash ID |
| Length of Tracking Tokens |
| Length of non-volatile content |
| Length of content included in the Put Proposal message. |
| Delivery Group |
| Maximum Delivery Rate |

FIG. 24

Chunk Accept Message Not Now

| Not Now Chunk Accept Message |
|---|
| Total # of Fragments in Message (1) |
| Target Negotiating Group |
| Copy of Put Proposal ID (Source, Sequence #, Sub-Sequence #) |
| Earliest Suggested Retry |

Chunk Accept Message Content Already Stored

| Content Already Stored Chunk Accept Message |
|---|
| Total # of Fragments in Message (1) |
| Target Negotiating Group |
| Copy of Put Proposal ID (Source, Sequence #) |

Chunk Accept Message Proposed Rendezvous

| Proposed Rendezvous Chunk Accept Message |
|---|
| Total # of Fragments in Message (1) |
| Target Negotiating Group |
| Copy of Put Proposal ID (Source, Sequence #, Sub-Sequence #) |
| Proposed Rendezvous (Time, Max Bandwidth) |

FIG. 25

Rendezvous Transfer Message

| Rendezvous Transfer Message Type |
|---|
| Total # of Fragments in Message |
| Target Delivery Group |
| List of Delivery Group Members |
| Delivery Rate |
| Content Hash ID of Chunk |
| Length of Tracking Tokens |
| Length of Payload |
| Remaining Content (tracking tokens and payload) not included in original Put Proposall |

Rendezvous Transfer Message with Arbitrary Chunk ID

| Arbitrary Chunk ID Rendezvous Transfer Message Type |
|---|
| Total # of Fragments in Message |
| Target Delivery Group |
| List of Delivery Group Members |
| Delivery Rate |
| Content Hash ID of Chunk |
| Arbitrary Chunk ID |
| Length of Tracking Tokens |
| Length of Payload |
| Remaining Content (tracking tokens and payload) not included in original Put Proposal |

FIG. 26

Unnamed Payload Ack Message

| Unnamed Payload Ack Message |
|---|
| Total # of Fragments in Message (1) |
| Copy of Put Proposal ID (Source, Sequence #) |
| Content Hash ID |

Payload NAK Message

| Specific Payload NACK Error Code |
|---|
| Total # of Fragments in Message (1) |
| Copy of Put Proposal ID (Source, Sequence #) |
| Content Hash ID |

Named Payload Ack Message

| Named Payload Ack Message |
|---|
| Total # of Fragments in Message (1) |
| Copy of Put Proposal ID (Source, Sequence #) |
| Content Hash ID |
| Bucket ID |
| Name Hash ID |
| Unique Version Identifier |

FIG. 27

Named Chunk Get Message

| Named Chunk Get Request Message |
|---|
| Total # of Fragments in Message (1) |
| Target Negotiating Group |
| Name: Bucket Hash ID / Name Hash ID / Unique Version Identifier Range |
| Delivery Group |
| Maximum Immediate Content Size per Get |
| Maximum # of Delegated Gets |
| Reception Window(s) |

Unnamed Chunk Get Message

| Unnamed Chunk Get Request Message |
|---|
| Total # of Fragments in Message (1) |
| Target Negotiating Group |
| Content Hash ID |
| Sub-sequence # |
| Delivery Group |
| Maximum Immediate Content Size per Get |
| Reception Window |

FIG. 28

Named Chunk Get Response Message

| Named Chunk Get Response Message |
| --- |
| Total # of Fragments in Message (1) |
| Target Negotiating Group |
| Copy of Get Request ID (Source, Sequence #, Sub-sequence #)) |
| Delivery Group |
| Timestamp when response would occur |
| ID of storage server |
| Content Hash ID |
| Bucket ID |
| Name Hash ID |
| Unique Version ID |
| Delivery Rate |
| Content Length |
| Immediate Content Length |
| Immediate Content |

Unnamed Chunk Get Response Message

| Unnamed Chunk Get Response Message |
| --- |
| Total # of Fragments in Message (1) |
| Target Negotiating Group |
| Copy of Get Request ID (Source, Sequence #, Sub-sequence #)) |
| Delivery Group |
| Timestamp when response would occur |
| ID of storage server |
| Content Hash ID |
| Delivery Rate |
| Content Length |
| Immediate Content Length |
| Immediate Content |

FIG. 29

Error Get Response Message

| |
|---|
| Error Code for Chunk Get Response Message |
| Total # of Fragments in Message (1) |
| Target Negotiating Group |
| Copy of Get Request ID (Source, Sequence #, Sub-sequence #)) |
| Delivery Group |

FIG. 30

SCALABLE TRANSPORT WITH CLIENT-CONSENSUS RENDEZVOUS

CROSS-REFERENCE TO RELATED APPLICATION(S)

The present patent application claims the benefit of U.S. Provisional Patent Application No. 61/755,930, entitled "Tailored Multicast of Payload for Distributed Storage Systems," filed on Jan. 23, 2013 by Caitlin Bestler, et al., the disclosure of which is hereby incorporated by reference in its entirety. The present patent application also claims the benefit of U.S. Provisional Patent Application No. 61/844,262, entitled "Scalable Transport Optimized for Multicast Replication with Edge-Managed Flow Control," filed on Jul. 9, 2013 by Caitlin Bestler, et al., the disclosure of which is hereby incorporated by reference in its entirety. The present patent application is also related to: U.S. patent application Ser. No. 14/095,839, entitled "Scalable Transport Method for Multicast Replication," filed on even date herewith by Caitlin Bestler, et al.; U.S. patent application Ser. No. 14/095,843, entitled "Scalable Transport System for Multicast Replication," filed on even date herewith by Caitlin Bestler, et al.; and U.S. patent application Ser. No. 14/095,855, entitled "Scalable Transport with Cluster-Consensus Rendezvous," filed on even date herewith by Caitlin Bestler, et al.

BACKGROUND

1. Technical Field

The present disclosure relates generally to data storage systems and data communication systems.

2. Description of the Background Art

With the increasing amount of data is being created, there is increasing demand for data storage solutions. Storing data using a cloud storage service is a solution that is growing in popularity. A cloud storage service may be publicly-available or private to a particular enterprise or organization. Popular public cloud storage services include Amazon S3™, the Google File System™, and the OpenStack Object Storage (Swift) System™.

Cloud storage systems may provide "get" and "put" access to objects, where an object includes a payload of data being stored. The payload of an object may be stored in parts referred to as "chunks". Using chunks enables the parallel transfer of the payload and allows the payload of a single large object to be spread over multiple storage servers.

SUMMARY

The present disclosure provides systems and methods for using multicast communications via unreliable datagrams (for example, unreliable datagram protocol or UDP packets) sent on a protected traffic class. The use of multicast unreliable datagrams enables collaboration among the member of a baseline multicast group (also known as the "Negotiating Group") to allow an upper layer to choose a "Rendezvous Group" of servers that will concurrently receive Chunks of data. The presently-disclosed protocol provides effectively reliable multicast delivery while avoiding the overhead associated with point-to-point protocols.

In accordance with the presently-disclosed protocol, the traffic from one server may be advantageously bounded by a linear scaling of the number of servers in multicast groups, rather than an exponential scaling of point-to-point connections with expensive setup and teardown of the connections. For example, when the cluster increases by a factor of 10, linear scaling of resources also means an increase by a factor of 10, while geometric scaling would require increasing by a factor of 100. In addition, the multicast rendezvous creates an edge managed flow control. This control accounts for the dynamic state of the storage servers in the cluster. The protocol may advantageously manage the flow without centralized control, centralized management, or centralized maintenance of state. This traffic shaping avoids the loss of data due to congestion during sustained oversubscription.

Other embodiments, aspects, and features are also disclosed.

BRIEF DESCRIPTION OF THE DRAWINGS

FIG. 24 depicts exemplary encoding structures for chunk put proposal messages in accordance with an embodiment of the invention.

FIG. 25 depicts exemplary encoding structures for chunk accept messages in accordance with an embodiment of the invention.

FIG. 26 depicts exemplary encoding structures for rendezvous transfer messages in accordance with an embodiment of the invention.

FIG. 27 depicts exemplary encoding structures for payload acknowledgement messages in accordance with an embodiment of the invention.

FIG. 28 depicts exemplary encoding structures for get request messages in accordance with an embodiment of the invention.

FIG. 29 depicts exemplary encoding structures for get response messages in accordance with an embodiment of the invention.

FIG. 30 depicts exemplary encoding structures for an error get response message in accordance with an embodiment of the invention.

DETAILED DESCRIPTION

Figure 1:
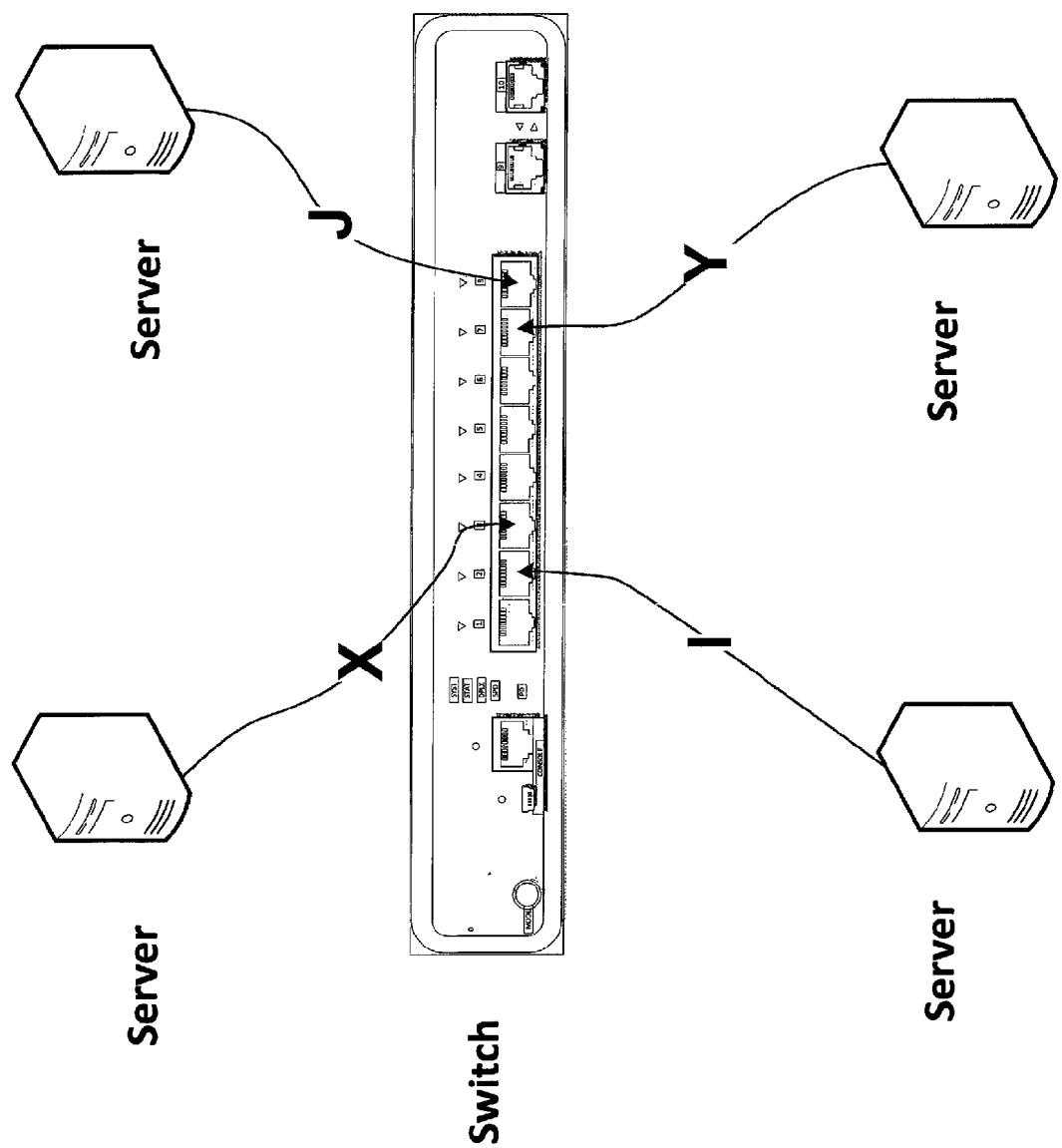
FIG. 1 depicts a non-blocking switch.

As described herein, multicast communications may provide great value in storage networking. There are several instances where the desired distribution of information is from one sender to multiple receivers. These include:

1) Replication of storage content. Creating more than one replica is generally desired to protect against the loss of individual storage servers.
2) Finding the most suitable set of storage servers to accept new content. Storage servers have dynamically varying capacities and work queue depths. Finding the servers that could store the content most quickly allows transactions to complete in the shortest possible time. If point-to-point protocols performed this survey, the polling process could easily take more time than the potential savings in time.
3) Finding the best storage server to process a specific get request has similar issues as finding the most suitable set of storage servers to accept new content.
4) Network replication to additional servers in order to create extra replicas for caching content, distributing content to archival storage and to remote networks comes with only minimal network traffic increase and no increase in server operations for reading the extra copies for these separate purposes.
5) Enabling parallel updating of distributed content (e.g. a Distributed Hash Allocation Table) on all cluster members.

While the value of these potential multicast communications is clear, the conventional wisdom has been that multicast cannot be reliable enough for storage, and therefore the overhead of point-to-point protocols must be tolerated in order to provide reliability. Use of multicast in storage clusters has been conventionally limited to the "keep-alive" protocols, which track the set of storage servers currently connected. Conventionally multicast messaging is not used for the storage content itself.

The present disclosure provides an effectively reliable transport layer for multicast communications. The methods disclosed herein are optimized for storage networking within a local area network with short and reasonably uniform round-trip times, but they may be layered on top of any transport services that provides an unreliable datagram service and multicast addressing.

Congestion Control in Point-to-Point Network Replication

Replicating storage over a shared network typically involves large transfers initiated independently by multiple sources. In such cases, some form of congestion control is required to avoid over-subscribing the buffering capacity of the storage network. Designing a core network to be non-blocking is feasible and desirable; however, it is currently implausible to design the target nodes with enough capacity to receive concurrent transfers from every source that might want to transmit. Moreover, even with a non-blocking core, some form of congestion control is required to allocate the bandwidth on the last link to the target servers.

In a simple solution, each content source replicates content to each distinct storage server using Unicast point-to-point reliable connections (most frequently TCP/IP). However, this solution can make the link from the content source a bottleneck that limits the speed of sending the new content into the network. According to this solution, if K is the desired replication count (e.g., three), then the source server sends the content K times (each time over a point-to-point connection). The OpenStack Object Service ("Swift") has this design characteristic.

Another Object Storage system, the Hadoop Distributed File System (HDFS), partially addresses this problem by serializing replication of new content. The content source puts to a first storage server, which then replicates that chunk to a second storage server, which then replicates it to a third storage server. If the server performs replication on a cut-through basis, the impact on an isolated put transaction would appear to be minimal (two times the cut-through latency, which might be as small as a single Ethernet frame for each hop).

However, such an analysis ignores the problem that the servers that are receiving chunks or objects must also retrieve and deliver content on demand. Most object storage systems operate in a write-once read-many (WORM) fashion. When a storage server takes responsibility for replicating new content the server has the limitation that the replication bandwidth is in contention with retrieval bandwidth. The only way to avoid congestion drops is to delay either the replication traffic or the retrieval traffic. The latency for puts and/or reads (gets) will suffer because of this contention.

To optimize replication of content in distributed storage systems, the presently-disclosed solution multicasts the content so as to optimize both the load on the servers and the shaping of the network traffic. While it is desirable to multicast replication traffic, doing so should not be allowed to cause network congestion and resulting dropped packets. Hence, as further disclosed herein, packet drops may be dealt with by retransmission using unicast replication on a point-to-point basis.

Reasons why Multicast was not Used in the Past

This section describes some reasons why applicants believe that multicast has not been used in the past for replication of stored content.

It would be optimum for storage networking to put the content to the network once and have that content reliably arrive at each of N destinations. One challenge to achieving this optimum result is that each chunk is typically encoded as multiple L2 (layer 2) frames. L2 networking protocols, such as Ethernet or InfiniBand™, have individual frames that are small compared to the size of the typical chunk saved in a storage system. For example in a single user Ubuntu workstation with over 584,843 files, the average file size is 240,736 bytes, (totaling ~140 GB) although the median file size is only 3,472 bytes and the largest file is 2.9 GB. Hence, a typical put (or get) will need to deliver very many L2 frames without any portion of the message being dropped.

Modern wired networks have exceedingly low error rates on raw transmission. Therefore, when a message is comprised of hundreds of L2 frames the most common cause of non-delivery of a message is congestion-induced drops. Message drops caused by a transmission error on even one of hundreds of frames are exceptionally rare.

With unicast delivery, the transport protocol acknowledges each packet within the overall message (typically only sending the acknowledgement for every other packet). However, typical point-to-point transport protocols negotiate a packet or byte sequence number during connection establishment. It is not feasible to simply multicast a TCP packet to multiple receivers and simply collect the acknowledgements from each target because each target will have selected a different random starting sequence for itself. With TCP, for example, network elements would have to modify the TCP sequence number for each target.

Generally, multicast delivery has been limited to unreliable delivery or has relied on negative acknowledgements to allow limited retransmission requests.

The challenges of using multicast distribution for reliable delivery of bulk payload has limited deployment of multicast addressing within storage clusters to control plane functions such as node discovery, health checking and negotiating which server would be assigned to store each object. However, conventional unicast protocols have been used to reliably transfer bulk payload. As desirable as sending once and receiving multiple times would be, the conventional wisdom has been that this cannot be achieved with reliable delivery.

Splitting the traffic submitted once within the network to multiple destinations is challenging with TCP-like protocols. Either the splitter must act as a full application layer gateway, complete with providing persistent storage for all payload it has acknowledged until the gateway itself has been acknowledged by each target, or it must spoof flow control responses from the splice point such that no packet is originated until there is a window for delivery to each of the targets, and it acknowledges no packet until it has been acknowledged by all targets. Such a gateway would also have to track which targets had acknowledged a given packet and only forward retransmitted packets to those targets that had not already acknowledged it. Re-transmitting an acknowledged packet will cause the destination to conclude that its acknowledgement had not been received, from which it would infer that the network must be congested.

Advantageously, the use of multicast addressing is far simpler. At the network layer, multicast protocols are unreliable. Hence, no tracking of per-packet reception is required.

Utilizing multicast addressing allows new payloads to enter the switching fabric once, and then deliver them to N destinations. The protocol may then advantageously track the delivery of the entire message rather the tracking the delivery of individual packets. When congestion control properly minimizes the risk of congestion drops, the resulting delivery becomes reliable enough that per packet acknowledgements are no longer required. Hence, in accordance with an embodiment of the present invention, reliable delivery may be achieved using a simpler and more efficient transport protocol. In addition, the utilization of the switching fabrics buffers may be radically reduced, achieving more efficient distribution and more effective utilization of the network.

Conventional point-to-point transport protocols rely on per-packet error detection. However, with modern wired networks, applicants believe that protecting data integrity for the entire message is more effective. This is because layer 2 error checking ensures that very few packets have undetected errors, and retransmission of the entire message is acceptable when it is seldom required.

As described herein, a congestion control protocol may be designed for environments where dropped packets are extremely rare by avoiding congestion on the edge links to Ethernet end stations. In particular, a congestion control protocol that prevented concurrent bulk transfers to a given egress link would make it safe to transmit the entire chunk with a single ACK/NAK. Retransmission of the entire chunk would be required after an unsuccessful delivery attempt, but this is a cost easily carried if congestion drops have been avoided and dropped frames are extremely rare. The benefits of a simplified protocol, and lesser bandwidth required for acknowledgements themselves, would compensate for the extremely rare retransmission. Combined with the benefits of multicasting, such a congestion control protocol that enables coordination of bulk data transfers in a way that avoids edge link congestion-induced packet drops should generally improve overall network utilization.

Note that the ability to avoid congestion by scheduling delivery of messages at a higher layer is dependent on networking layer 2 providing some basic traffic shaping and congestion avoidance on its own.

L2 Traffic Shaping Capabilities

The presently-disclosed solution utilizes edge-based congestion control for multicast messages. To understand how edge-based congestion control can avoid congestion-based drops of the layer 2 (L2) frames within an unreliable datagram, it is useful to first review the traffic shaping capabilities of advanced Ethernet switches. In relation to such traffic shaping capabilities, the following discusses a non-blocking switch, a non-blocking core, multiple traffic classes, and protected traffic classes.

1) Non-Blocking Switch

A switch can be considered to be non-blocking if it is capable of running every one of its links at full capacity without dropping frames, as long as the traffic was distributed such that it did not exceed the capacity on any one of its links. For example, a non-blocking eight-port switch could relay traffic between four pairs of end stations at full wire speed.

More usefully, each of the eight ports could be sending $\frac{1}{7}$th of the wire speed to each of the other ports. A non-blocking switch has sufficient internal buffering so it can queue the output frames to any one of its ports. The other ports can "share" this output without having to synchronize their transmissions. If they each have a sustained rate of $\frac{1}{7}$th of the wire capacity then the output queue for the target port may grow temporarily, but it will not grow indefinitely. There are well-known algorithms to determine the maximum buffering capacity required.

A non-blocking switch may offer service level agreements (SLAs) to its end stations that are capable of providing a sustained level of throughput to each of its ports, as long as no egress port is over-subscribed on a sustained basis. Referring now to FIG. 1, the illustrated switch provides a non-blocking switch fabric, such that a flow from X to Y cannot be adversely impacted by any flow from I to J.

2) Non-Blocking Core

A non-blocking core is a collection of non-blocking switches that have sufficient bandwidth between the switches such that they can effectively act as though they were simply a large aggregate switch.

3) Multiple Traffic Classes

Switches typically offer multiple traffic classes. Frames are queued based upon the egress port, Ethernet class of service, and other factors such as VLAN (virtual local area network) tags.

Usually these queues do not represent buffers permanently assigned to separate queues, but rather just a method for accounting for buffer usage. When a queue is assigned N buffers it does not mean that N buffers are identified in advance. Rather it means that the number of buffers the queue is using is tracked, and if it exceeds N the excess buffers are subject to being dropped.

Advanced switches are capable of monitoring the depth of queues for multiple traffic classes and potentially taking action based on queue depth (marking excessive traffic, generating congestion notifications, or simply dropped non-compliant frames). The traffic class configuration is typically a steady configuration item for any switch. Well known algorithms allow the switch to enforce that a given traffic class will be able to sustain X Gb/sec without requiring the switch to track the state of each flow through the switch.

4) Protected Traffic Classes

A Protected Traffic Class is a traffic class that is reserved for a specific use. The network forwarding elements are configured to know which ports are members of the protected traffic class. L2 frames that are marked as part of a protected traffic class, but arrive from unauthorized ports, are simply dropped. Typically switches will also block, or at least limit, relaying frames in a protected traffic class to non-member ports.

FCoE (Fibre Channel Over Ethernet) is one example of a protocol which is dependent on a protected traffic class. The protocol is not robust if non-compliant frames can be accepted from unauthorized ports.

Replicast Transport Layer

Figure 2:
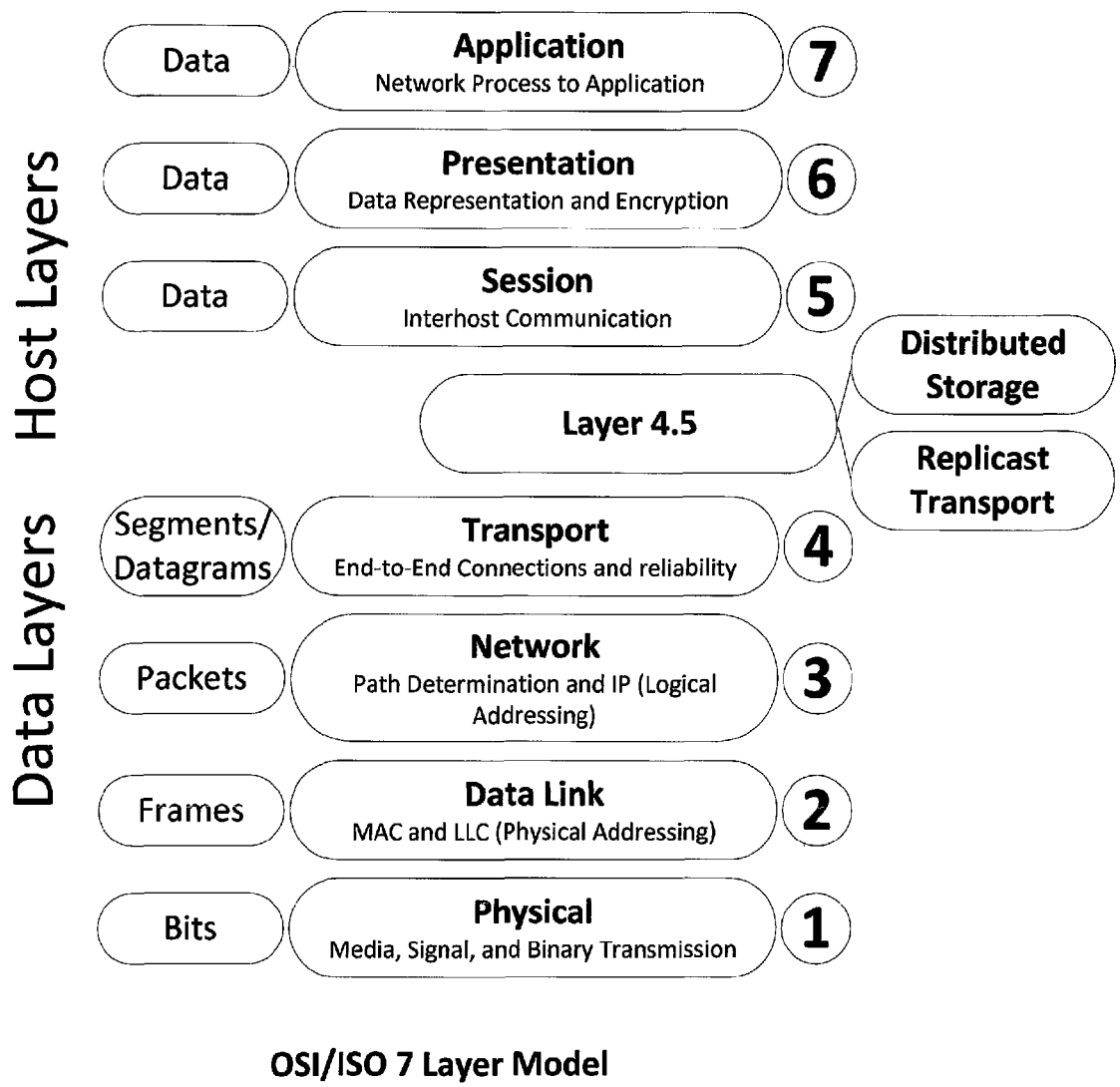
FIG. 2 depicts where the replicast transport layer may fit into the conventional OSI/ISO Seven Layer Model in accordance with an embodiment of the invention.

The present disclosure details a "Replicast" transport layer in accordance with an embodiment of the present invention. In one implementation, the Replicast transport layer operates in conjunction with a distributed storage layer for a distributed object storage system. FIG. 2 illustrates the conventional model and where Replicast transport layer and distributed storage layers may be inserted into that model as "Layer 4.5" between the conventional transport layer 4 and the conventional session layer 5.

While the present disclosure details a Replicast transport service that is intended for usage by a distributed object storage system, the specific multicast messaging capabilities provided are not constrained to support only distributed object storage. Other applications can benefit from the presently-disclosed Replicast transport services. For example, a method for replicating file system images between file servers could also use the Replicast transport services disclosed herein. One example of this would be ZFS file servers replicating the output of the "zfs send" utility.

The following Table 1 itemizes the assignment of responsibilities between the Replicast transport layer provided by the present invention and an example distributed storage layer that may be supported by the Replicast transport layer:

TABLE 1

Division of responsibilities between Replicast transport and distributed storage layers

| Responsibility | Layer | Comment |
|---|---|---|
| Detection of transmission error. | Transport | A hash signature is calculated for all transferred content. |
| Detection of lost L3 packets | Transport | Messages with lost packets will fail the signature test for the complete message. Packets are sequenced within a message, allowing for checkerboard testing for reception of the complete message. |
| Detection of lost L5 messages | Storage | The transport layer will only detect messages that are partially lost, not any that are completely lost. The storage layer must detect missing messages and responses. |
| Determination of success | Storage | The transport layer can detect whether specific recipients successfully received a message without corruption, but it cannot determine whether the overall message was delivered to a sufficient set of recipients. |
| Retry of L5 message | Storage | The transport layer detects failure of individual deliveries. The storage layer must determines when and if a given message will be retried. |
| Pacing of Unsolicited Messages | Storage | The transport layer indicates how often the storage layer may transmit unsolicited messages, but it does not pace those deliveries itself. Rather it relies on the storage layer to choose which messages to submit to comply with the rate published. |
| Congestion Avoidance | Transport | The transport layer works with L2 congestion avoidance techniques (such as IEEE 802.1 DCB—Data Center Bridging) protocols to provide delivery of unreliable datagrams without dropping packets due to congestion. Note that IEEE 802.1 DCB is only one mechanism for achieving drop-resistant L2 delivery that is protected from other traffic classes. |
| Traffic Selection (Shaping Storage Traffic) | Storage | The primary congestion avoidance technique used is to perform most bulk content transfer with reserved bandwidth. The transport layer enforces reservations, but the storage layer chooses which reservations to grant by determining when each storage server would be capable of doing a specified rendezvous transfer. The present invention does not specify what algorithm any storage server in the cluster will use when proposing rendezvous transfer times based upon its current workload. There are many well =-known algorithms for making such estimates, determination of which algorithms are most cost effective for which storage resources is left to each specific embodiment. |
| Distributed Deduplication | Storage | The storage layer determines when a proposed transfer is not needed because the content is already stored locally. The transport layer merely relays this information. |
| Management of bandwidth between Traffic Classes | Enhanced L2 (such as DCB) | The L2 layer is responsible for protecting the traffic class from other traffic. Presumably, it also protects the other traffic from the storage traffic class. |
| Management of bandwidth within the storage traffic class | Transport | The transport layer is responsible for allocating the bandwidth provided by L2 layer to specific messages and transfers. |
| Transmit at most once | Transport | Datagrams are transmitted once and are typically delivered to all members of the target multicast group. Datagrams cannot be delivered more than once because each L2 message is uniquely identified by source and sequence number. Further, each datagram is identified as a specific fragment of an L5 message. Packets that are duplicate receptions are discarded. |
| Datagram sequencing | Transport | Unreliable datagrams are labeled as to their sequencing within an L5 message. |
| Multicast addressing | unreliable datagram service | Such as UDP/IP/Ethernet or UD/InfiniBand. |

Edge Managed Flow Control

The present disclosure combines the lack of central bottlenecks with the ability to factor dynamic storage-server specific metrics, such as available storage capacity, work queue depth and network congestion on the storage server's ingress ports.

An overly simplified analysis would seek to have every storage server evaluate its own suitability for storing a specific chunk, and then having the source select the number (n) of storage servers with the highest score. However, this would not scale as the total number (N) of storage servers in a cluster increased. As disclosed herein, a scalable methodology, instead, controls the total number of requests made to each storage server. Ideally, as the cluster workload grows, the number of requests per server can be held nearly constant by adding servers and network bandwidth. This will allow the entire cluster to scale in a nearly linear fashion.

The present disclosure accomplishes holding nearly constant the number of requests per server by selecting a subset of the storage servers to process requests related to any specific chunk. The present disclosure refers to this subset as the "Negotiating Group". The Negotiating Group will select specific storage servers from the group to store the specific chunk. Generally, the number of members in a Negotiating Group should be kept stable even as the number of storage servers grows. The complexity of the negotiation process is determined by the number of storage servers in the Negotiating Group, not by the size of the entire cluster.

Referring now to Table 2, an exemplary size (n) of the Negotiating Group is that it should scale to on the order of K multiplied by $Log_{10}(N)$ [i.e. should scale to $O(K*Log_{10}(N)]$, where K is a function of the storage replication count, and where N is the total number of cluster members. K may typically vary from one to five. Hence, as shown in Table 2, depending on the value of K, for 100 servers in the cluster, there should be two to ten members of the Negotiating Group, and for 10,000 servers in the cluster, there should be four to twenty members of the Negotiating Group.

TABLE 2

Number of Designated Servers in a Negotiating Group for a Cluster

| Replication Cluster Members | K = 1 | K = 2 | K = 3 | K = 4 | K = 5 |
| --- | --- | --- | --- | --- | --- |
| 100 | 2 | 4 | 6 | 8 | 10 |
| 1,000 | 3 | 6 | 9 | 12 | 15 |
| 10,000 | 4 | 8 | 12 | 16 | 20 |

In an exemplary implementation, the server performing the "put" operation for a chunk will select a set of servers from the Negotiating Group. The selection method is not dependent on a central process or bottleneck and is capable of adapting to storage server backlogs and capacity.

In an exemplary selection method, all members of the Negotiating group receive a proposal to store the new chunk (i.e. a Put Proposal) via multicast-addressed UDP datagrams, without adding extra transmission burden on the source server. The source chooses the Negotiating Group by mapping the appropriate Chunk Hash ID to a Distributed Hash Allocation Table so as to specify the membership of the Negotiating Group and identify its members. A Chunk Hash ID may be a cryptographic hash of either a chunk's payload (for chunks that hold only payload) or of the identity of the object (for chunks holding metadata). In an exemplary embodiment, this mapping is accomplished by indexing one row from a shared Distributed Hash Allocation Table. In an exemplary implementation, each chunk may have a unique identifier that effectively incorporates distributed deduplication into the distribution algorithm, making the implementation highly tailored for document storage applications. There are existing techniques that allow distributed deduplication to co-exist with the provision of cryptographic protection for document content.

Referring back to the exemplary selection method, each recipient of the Put Proposal calculates when and if it could accept the chunk, or whether it already has the indicated chunk. The recipient returns a Put Accept message with the appropriate indication to not only the source, but to all other members of the Negotiation Group. Limitations on the recipient's available storage that make this specific storage server less desirable as a target are reflected by making this storage server less prompt in acknowledging the proposal or in scheduling the receipt of the chunk. Additional considerations are possible to indicate that perhaps the recipient has a heavy workload and, if there are other recipients with less workload, that their responses may also be more prompt.

While the present disclosure is not necessarily limited to storage servers, in most embodiments, the storage servers will utilize the entire bandwidth available to a single reservation at a time. In accordance with the present disclosure, there is no benefit to delivering part of a chunk. Therefore, it will generally be desirable to finish each request as early as possible, even if it means delaying the start of the transfer of a later request. It is the aggregate completion times for the transfers that matters. By contrast, conventional file systems will generally seek to make forward progress for all transfers in parallel.

Upon the collection of the responses from the Negotiating Group within the timeout window, the Chunk Source decides whether to deliver the Chunk payload in order to increase the number of replicas. If so, it creates the Rendezvous Group, which is a subset of the Negotiating Group. In the exemplary implementation, other members of the negotiating group may also see this response and update their list of designated servers that hold a copy of the Chunk.

The present disclosure also provides for efficient replication of content to the Rendezvous Group by relying on the rendezvous negotiation to eliminate the need for sustained congestion control for a multicast Chunk Put or conventional point-to-point reliable transport protocols.

Exemplary Storage Cluster

Figure 3:
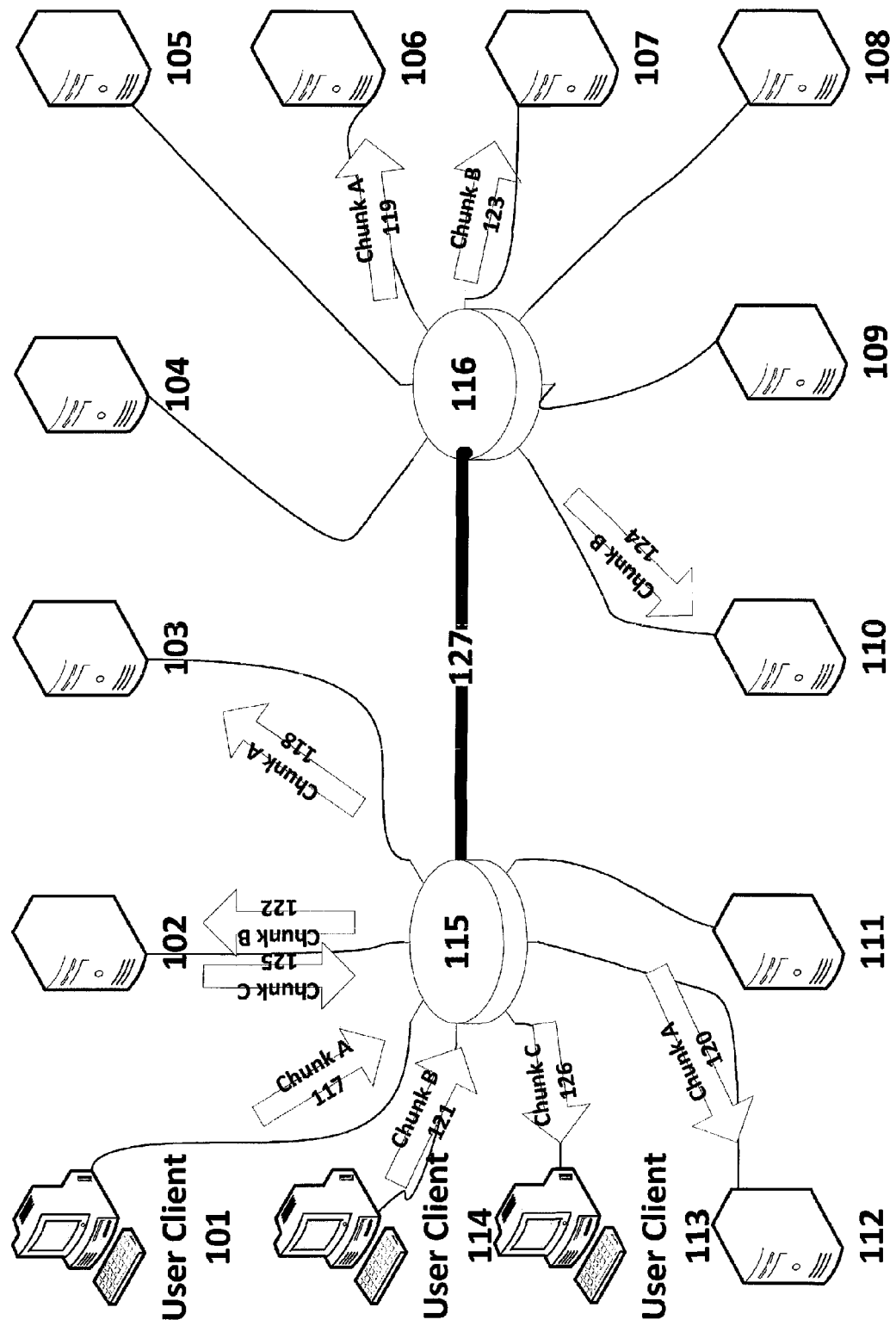
FIG. 3 is a simplified depiction of chunk transmission in an exemplary distributed storage system in accordance with an embodiment of the invention.

FIG. 3 is a simplified depiction of chunk transmission in an exemplary storage cluster in accordance with an embodiment of the invention. As shown in FIG. 3, there is a cluster 100 of servers and clients. The servers 102 through 112 are connected to Ethernet switches 115 and 116. While several servers and two switches are depicted, an implemented storage cluster may have a multitude of servers and a larger number of switches. The switches, in turn, may be connected to each other by one or more Ethernet trunk 127. In an exemplary implementation, the switches may be non-blocking switches, and the switches together with the interconnecting trunks may form a non-blocking core.

In this depiction, Chunk A 117 is sent from user client 101 to network switch 115 and is multicast replicated to Server 103 as Chunk A 118, Server 106 as Chunk A 119, Server 112 as Chunk A 120. Chunk B 121 is sent from user client 114 to switch 115 and is replicated to Server 102 as Chunk B 122, through trunk 127 to switch 116 and then to Server 107 as Chunk B 123 and to Server 110 as Chunk B 124. At the same time Server 102 is returning Chunk C 125 via Switch 115 to client user 113 as Chunk C 126.

Serial Transmission of Chunk Copies

Figure 4:
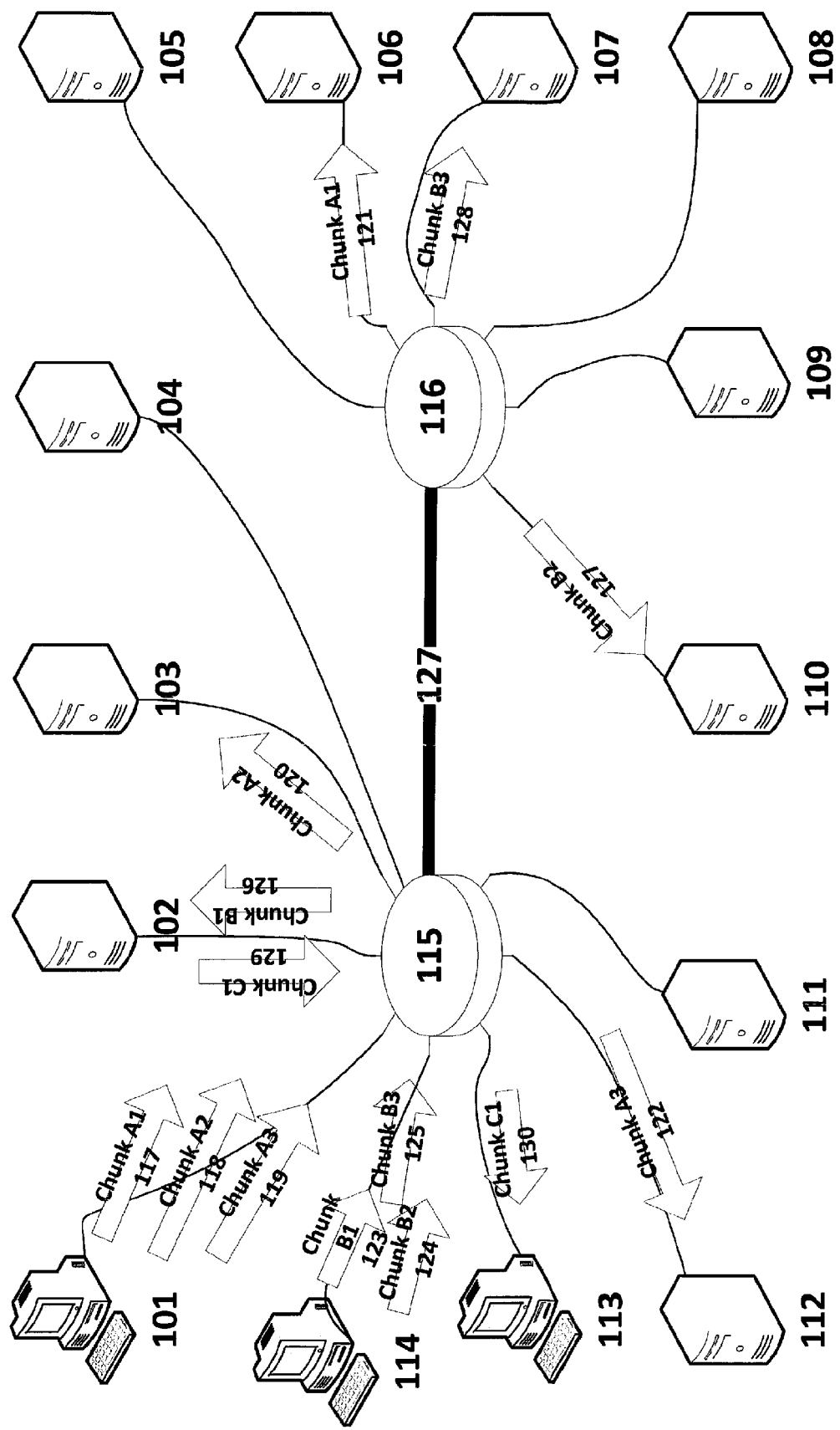
FIG. 4 depicts congestion on inbound links of a distributed storage system with serial transmission of chunk copies.

FIG. 4 depicts congestion on inbound links of a distributed storage system with serial transmission of chunk copies. Such serial transmission of chunk copies is utilized, for example, in the OpenStack Object Service. The servers, clients, switches and trunks of FIG. 4 may be arranged as described above in relation to FIG. 3.

As depicted in FIG. 4, we see that Chunks A1 117, A2 118 and A3 119 (all copies of Chunk A) are transmitted sequentially through the connection between the user client machine 101 and the Ethernet switch 115. From that point, Chunk A1 121 is sent to the target server 106, Chunk A2 120 is sent to a different server 103 and Chunk A3 122 to a third server 112.

Similarly the chunks B1 123, B2 124 and B3 125 (all copies of Chunk B) are transmitted from user client 114 to Ethernet switch 115 in sequential fashion, even though they are all copies of the same chunk B. From that point, the B1 Chunk 126, B2 Chunk 127 and B3 Chunk 128 are sent to separate servers. In addition, the C1 Chunk illustrates that, in addition to the PUT activities for Chunks A and B, users are also performing GETs of data. In particular, the C1 Chunk 129 is sent from the server 102 to the switch 115, and then the C1 Chunk 130 is sent to the user client 113.

Relayed Unicast Transmission

Figure 5:
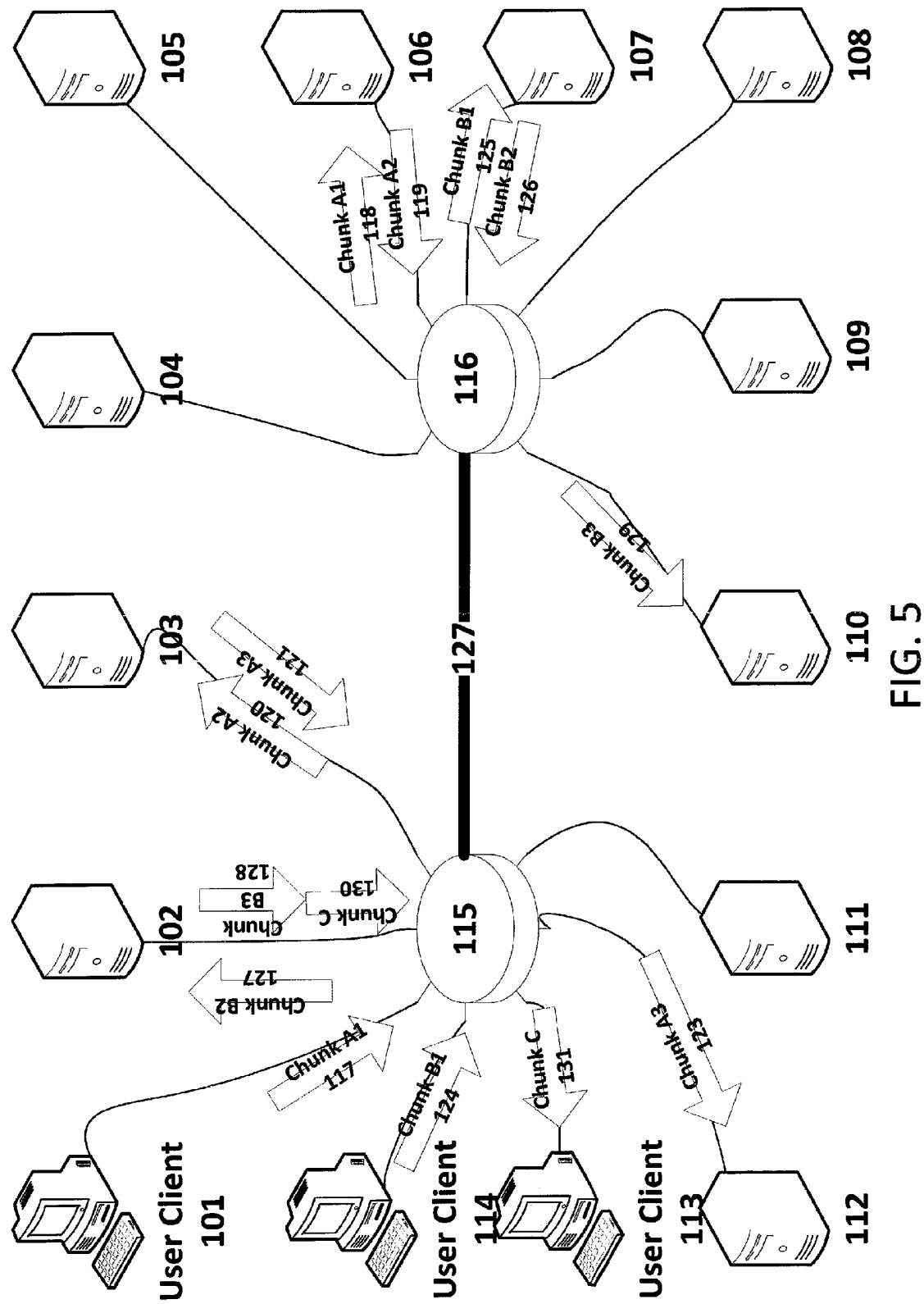
FIG. 5 depicts a distributed chunk put operation using relayed unicast transmission in a distributed storage system.

FIG. 5 depicts a distributed chunk put operation using relayed unicast transmission in a distributed storage system. Such a relayed unicast put is utilized, for example, in the HDFS. The servers, clients, switches and trunks of FIG. 5 may be arranged as described above in relation to FIG. 3.

In the illustration of FIG. 5, we walk through a sequence of events. The first event is that the user Client 101 transmits the first copy of Chunk A, namely Chunk A1 117, which is received by Server 106 as Chunk A1 118. In preferred implementations, while the Chunk A1 118 is being received, the Server 106 begins a "Cut-through" transmission (illustrated here by the ingress and egress of 118 and 119 overlapping each other) to start transmitting Chunk A2 119 which is a copy of Chunk A1. Other implementations are possible, including waiting until Chunk A1 118 is completely received prior to transmitting Chunk A2 119, but are less optimal. Chunk A2 120 is received by Server 103, copied and retransmitted as Chunk A3 121 (here again illustrated by the ingress and egress of 120 and 121) and finally received by Server 112 as Chunk A3 123.

Similarly, the user Client 114 transmits the first copy of Chunk B, namely Chunk B1 124, which is received by Server 107 as Chunk B1 125. In preferred implementations, while the Chunk B1 125 is being received, the Server 107 begins a "Cut-through" transmission (illustrated here by the ingress and egress of 125 and 126 overlapping each other) to start transmitting Chunk B2 126 which is a copy of Chunk B1. Chunk B2 127 is received by Server 102, copied and retransmitted as Chunk B3 128 (here again illustrated by the ingress and egress of 127 and 128) and finally received by Server 110 as Chunk B3 129. In this case, the retransmission of Chunk B3 128 may be delayed by the transmission of an asynchronous "get" operation which requested Chunk C 130. In this way, other operations on the Servers performing "get" operations (to retrieve data upon request) may slow down the replication of packets by the Servers.

The C Chunk illustrates that, in addition to the PUT activities for Chunks A and B, users are also performing GETs of data. In particular, the C Chunk 130 is sent from the server 102 to the switch 115, and then the C Chunk 131 is sent to the user client 113.

Overview of Replicast Transport Protocol

The present disclosure provides a method of supporting effectively reliable message exchange and rendezvous payload transfers within a multicast group or subsets of the multicast group (possibly combined with an external client). An exemplary implementation of the disclosed method may be referred to herein as the "Replicast" transport protocol.

The Replicast transport protocol sends unreliable datagrams over a protected traffic class. Protected traffic classes are a known networking mechanism used in many different IEEE 802.1 protocols. One example particularly relevant for storage networking is FCoE (Fibre Channel over Ethernet). The requirements for a protected traffic class may be summarized as follows.

L2 frames are admitted to this traffic class only from explicitly authorized end stations.

L2 frames are only delivered to members of the group.

As long as this traffic class is in compliance with a bandwidth budget provisioned for it, its frames will not be dropped due to congestion caused by L2 frames from other traffic classes.

Effective Reliability

A goal of the Replicast transport layer (when it is used by a distributed storage application) is to enable effectively reliable transfer of chunks and associated tracking data within a storage cluster and to/from its clients. Distributed storage applications frequently need to make multiple replicas of storage chunks. Enabling an effectively reliable multicast replication may radically improve the efficiency of network utilization and the efficiency of server resources in a cluster.

The Replicast transport layer disclosed herein is optimized for networks where actual transmission errors are rare. In such networks, packets are typically dropped due oversubscription of either forwarding or receiving buffers.

Distributed storage applications supported by the Replicast transport protocol preferably may be expected to require more thorough validation of successful transfer of data than is supported by conventional point-to-point transport protocols (such as InfiniBand Reliable Connection, TCP/IP or SCTP/IP). To support more thorough validation of successful transfers, the Replicast transport protocol disclosed herein provides hash signatures for the entire chunk and self-validating tracking data which may be used to validate successful transfers. These measures allow incomplete or corrupted transfers to be detected by and reported to the upper layers. For example, a multicast transmission of a chunk may be successfully received by 5 out 7 target nodes. The question of whether that is a "successful" delivery may be properly answered at an upper layer; it is not something the transport layer can or should determine.

Congestion Avoidance

The present disclosure utilizes an assumption that the lower-layer transports (below the Replicast transport layer) provide at least minimal congestion avoidance features that can deal with short-lived congestion without dropping frames. The IEEE 802.1 Data Center Bridging (DCB) protocols are an example implementation of a suitable lower layer transport. Another goal of the Replicast transport layer disclosed herein is to further avoid congestion, particularly congestion over a sustained duration.

Unsolicited Vs. Solicited Bandwidth

The present disclosure seeks to effectively eliminate the risk of a congestion drop by tracking its own usage of unsolicited bandwidth, issuing its own reservations for solicited bandwidth, and relying on the lower transport layers to resolve very short span over-subscriptions and protect the traffic class from traffic from other classes.

Network administration will specify four bandwidth allocations for each participant in the protected traffic class:

Unsolicited inbound rate: Using known techniques, this translates to a required amount of buffering to receive unsolicited packets.

Unsolicited outbound rate: A base rate for transmission of unreliable datagrams that have no reservation. This rate may be adjusted dynamically by other sources of information. One source that must be used is the number of failed deliveries on prior attempts to transmit this datagram. This technique is known as the Aloha back-off algorithm.

Reserved outbound rate: This may limit the aggregate bandwidth of all rendezvous transmissions from this storage node. This limit would seldom be reached, so some embodiments may omit this from their implementation. One deployment where it would be useful is when the same node was also originating traffic from a different traffic class.

Reserved inbound rate: This node must limit the reservations it grants so that this rate is never exceeded.

The disclosed congestion avoidance method may be, therefore:

Provision buffering for reception and in-network forward elements adequate for both the Unsolicited and Solicited traffic. Unsolicited traffic is subject to peaks because there is no advance permission granted before a request is transmitted. Therefore, more buffering is needed to support a specific bandwidth when using Unsolicited messaging than would be required for reserved bandwidth.

Limiting transmission rates of unsolicited messages so that the probability of packet drop is low.

Utilizing Aloha-style random back-offs of retransmissions of Unsolicited messages used for requests.

Distributing and Retrieving Chunks

The presently-disclosed Replicast transport layer relies on the layer above it, a distributed storage system in one embodiment, to specify the following:

A Negotiating Group, which is a multicast group that will conduct the negotiation to determine the Rendezvous Group, and may determine the source for a data transfer in a get transaction.

A Rendezvous Group, which is a multicast group that will receive a data transfer. For a put transaction this group will be a subset of the Negotiating Group. For a get transaction this group will include the client or proxy that initiated the get transaction and may include other members of the Negotiating Group that wish to receive opportunistic copies of the chunk that has been requested.

A base bandwidth quota for unsolicited traffic that this node may generate to a specified traffic class. This quota is across support for all requests. This quota may be dynamically adjusted by many sources of information as to the congestion state of the network. At the minimum this set must include the number of recent messages sent by this node for which there was no timely response. It may include other sources of network status that are correlated with the congestion state of the network, including:

Measured queue depths on forwarding elements for queues that support this traffic class.

Receipt of packets for this traffic class which were explicitly marked to indicate congestion.

An increase in the one-way delay of packets for this traffic class through the network.

Reports of congestion from other nodes participating in this traffic class.

A bandwidth for this node to receive solicited transfers. The node will not grant reservations that exceed this quota.

Messages may be addressed to either Negotiating Groups and/or to Rendezvous Groups.

A negotiation is conducted within the Negotiation Group using unreliable datagrams sent with multicast addressing, as described in further detail below, to select a subset of those servers to which the bulk message must be delivered (or replicated at).

The purpose of the presently-disclosed transport is to deliver "chunks", which are large collection of bytes used by the upper layer, to the Rendezvous Group negotiated in the transaction. Additionally, a set of opaque "transaction tokens" may be associated with each chunk and updated in each transfer.

Typical uses of "chunks" by a distributed storage layer would include:

Large slices of object payload, typically after compression.

Metadata for versions of named objects, which will reference the payload chunks to allow the full object to be retrieved.

The presently-disclosed transport requires each chunk to have the following naming attributes:

1) A Chunk ID which uniquely identifies the chunk and which will never reference a different payload. In an exemplary implementation, the Chunk ID must be effectively globally unique for at least twice the lifetime that the chunk will be retained or referenced.

2) A Content Hash ID: If the selected hash algorithm is a cryptographic hash with strong immunity from pre-image attacks, such as SHA-2 or SHA-3, then the Content Hash ID may also serve as the Chunk ID. When only used to validate content the hash algorithm merely has to be resistant to coincidental collisions. Whether or not the Content Hash ID is used to identify the chunk, the Content Hash ID is used to validate the content of transmitted chunks or chunks retrieved from persistent storage.

In an exemplary implementation, the Chunk ID must have a uniform distribution so that it can efficiently index locally retained chunks on storage servers. In the preferred embodiment, the Chunk ID is always the Content Hash ID. Cryptographic hash algorithms always provide a uniform distribution.

A chunk may also have a Name Hash ID. The upper layer (for example, a distributed storage layer) may name some chunks that are used to store the root of metadata for a version of an object within the storage system and may also have a name that can be used to retrieve the chunk object. The Name Hash ID may be an additional partial identifier for such chunks (where the addition of a version identifier is required to form a complete additional identifier).

Distributed Gets and Puts

The common goal for the distributed get and put procedures is to use multicast datagrams sent using unsolicited bandwidth to negotiate a multicast rendezvous transfer using solicited bandwidth.

The first step is for the Client (User Client) to initiate the transaction by multicasting a request to the Negotiating Group. To put a chunk, the request that is multicast is a Multicast Put Proposal. To get a chunk, the request that is multicast is a Multicast Get Request.

Each of the recipients of this multicast request then responds to the Client (Chunk Sink for a get, or Chunk Source for a put). When getting a chunk, the response is a Get Response. When putting a chunk, the response is a Chunk Put Accept. Note that, for Multicast Get Requests, the Chunk Sink must accept each transfer from a specific source.

Once the rendezvous is negotiated, a multicast payload delivery can be initiated at the negotiated time. In either case (get or put), the rendezvous is to a multicast group, referred to herein as the Rendezvous Group. In an exemplary implementation, the Rendezvous Group is specified by the Client (Chunk Sink or Chunk Source). When getting a chunk, the Rendezvous Group will typically contain only the Chunk Sink, but may include other storage servers seeking to create additional replicas by piggy-backing on the delivery to the Chunk Sink. When putting a chunk, the Rendezvous Group is a subset of the Negotiating Group.

Lastly, when putting a chunk, a transaction closing acknowledgement is required. Note that the upper layer (for example, the distributed storage layer) which uses the disclosed Replicast transport layer is responsible for determining whether sufficient replicas have been created for a put transaction to complete, or whether the put transaction should be retried.

Also note that, when getting a chunk, the chunk may also be replicated to a volunteer storage server to provide additional replicas. The present disclosure allows for opportunistic replication of the chunks most frequently retrieved, thereby optimizing later retrieval of those same chunks.

Chunk Put Proposal—Client Consensus

Figure 6:
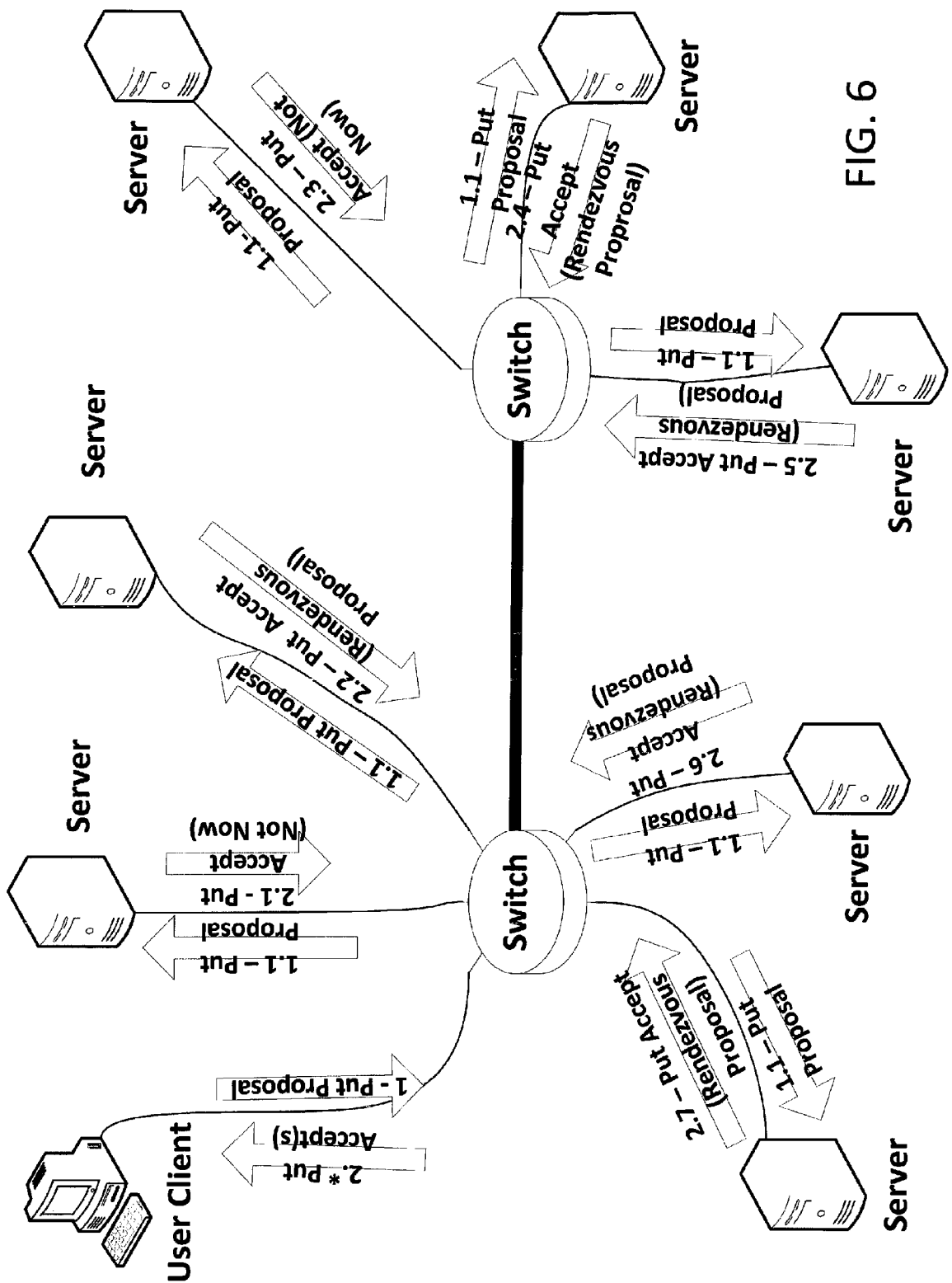
FIGS. 6-8 depict steps of a client-consensus-based procedure for proposing a chunk put to a distributed storage system in accordance with an embodiment of the invention.
Figure 7:
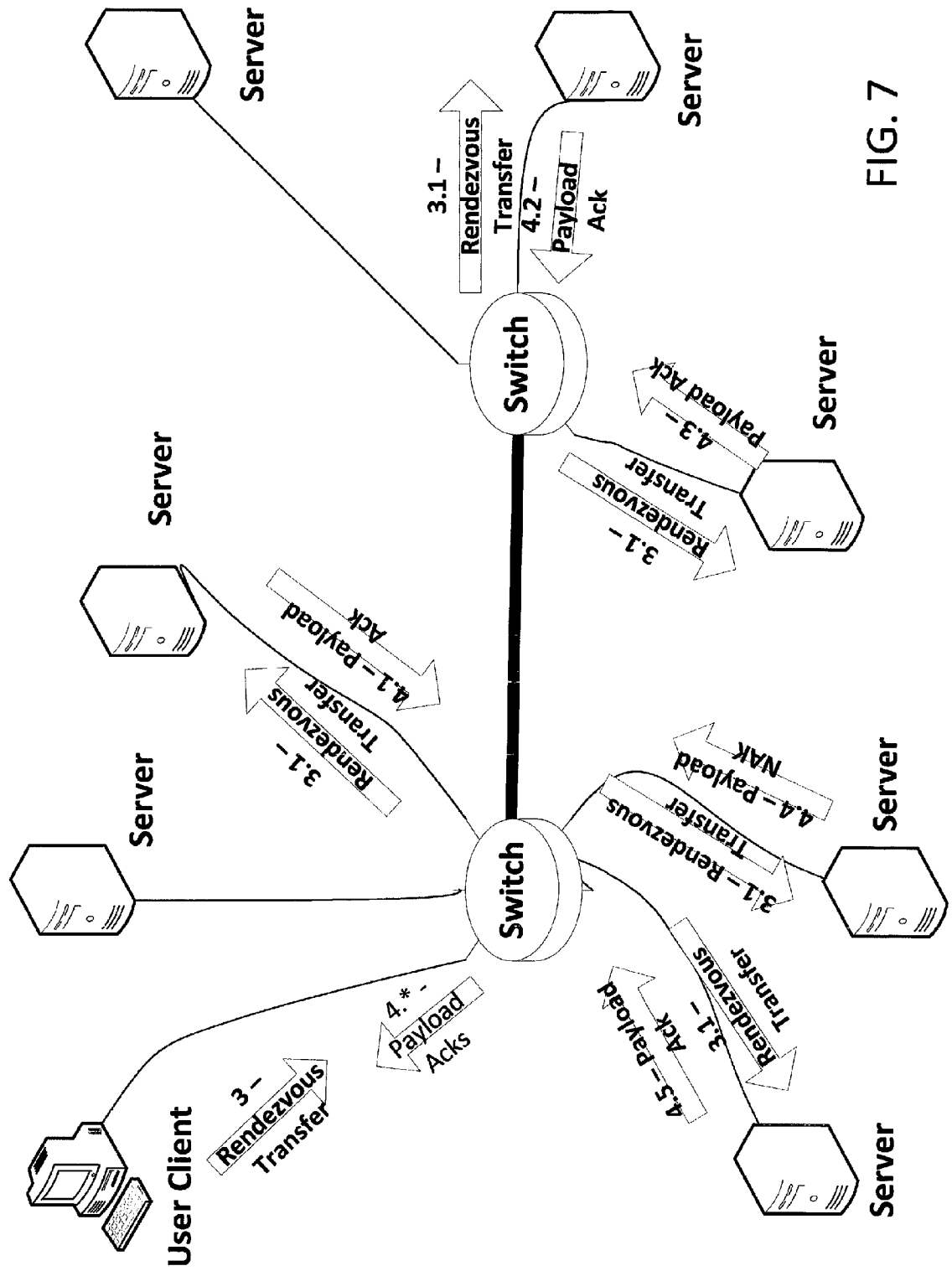
Figure 8:
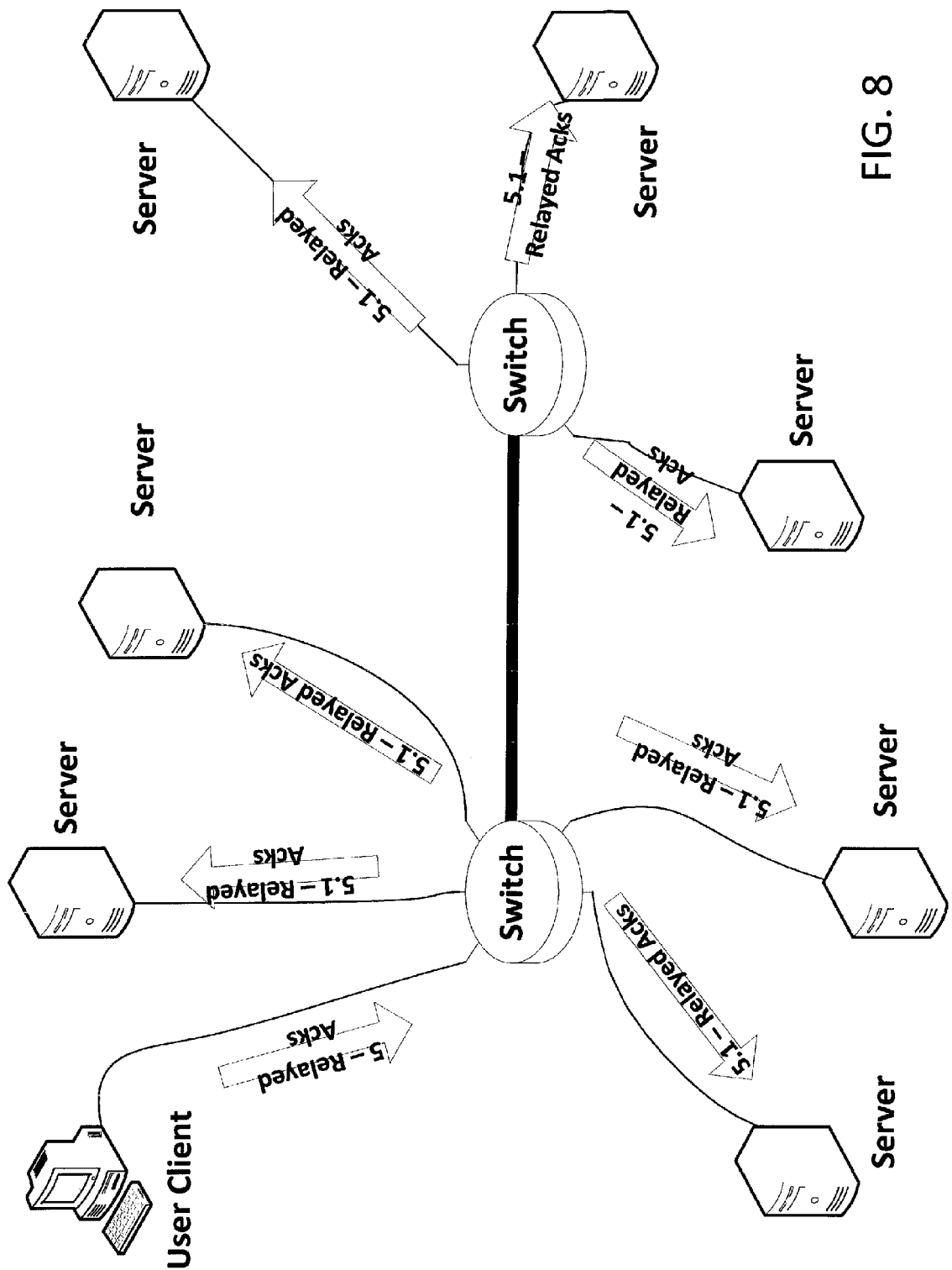

FIGS. 6-8 depict steps of a client-consensus-based procedure for proposing a chunk put to a distributed storage system in accordance with an embodiment of the invention. In this client-consensus variation of the distributed put algorithm, each of the Put Accept messages is unicast to the Client (i.e. to the Chunk Source). This client-consensus-based procedure has advantages over the serial transmission procedure of FIG. 4 and the relayed unicast transmission procedure of FIG. 5. In comparison to the serial transmission procedure, congestion on inbound links is avoided. In comparison to the relayed unicast transmission procedure, contention between the relay (put) traffic and get traffic is avoided.

In the illustrations of FIGS. 6-8, we will walk through a sequence of events for a put transaction with the client-consensus procedure. Before this sequence of events, an upper layer (i.e. a layer above the Replicast transport layer) has already specified a previously-provisioned multicast Negotiating Group, while multicast Rendezvous Group is negotiated as described below.

In a first step 1 shown, the Client multicasts a "Put Proposal" 1 to the Negotiating Group of Servers. Data fields in exemplary implementations of a Put Proposal message are described below in relation to FIG. 24. The Switches may make a best effort attempt to deliver a copy 1.1 of the Put Proposal 1 to every member of the Negotiating Group. Note that, as disclosed in this application, the nodes in aggregate are highly unlikely to transmit more unsolicited datagrams than the switch and receiver buffering can accommodate. Therefore, in almost all cases the Put Proposal will be delivered to the entire Negotiating Group.

Each recipient of the Put Proposal generates and sends a response in the form of a "Put Accept" message. In an exemplary implementation, the Put Accept message may be a "Not Now" message or a "Rendezvous Proposal" message. Data fields in exemplary implementations of a Put Accept message are described below in relation to FIG. 25. When generating a Rendezvous Proposal response, each server is free to consider its pending work requests, device performance history, and the desirability of accepting new content using a wide variety of algorithms. There is no need for these algorithms to be uniform amongst the servers. In other words, multiple different algorithms may be used by the servers. In the illustrated example: the Put Accept 2.1 message sent by a first Server in the Negotiating Group is a Not Now message; the Put Accept 2.2 message sent by a second Server in the Negotiating Group is a Rendezvous Proposal message; the Put Accept 2.3 message sent by a third Server in the Negotiating Group is a Not Now message; and the Put Accept 2.4, 2.5, 2.6 and 2.7 messages sent, respectively, by a fourth, fifth, sixth, and seventh Servers in the Negotiating Group are Rendezvous Proposal messages. The Put Accept 2.* (*=1, 2, ... , 7) messages are received by the sending Client (Chunk Source).

FIG. 7 illustrates the next steps in the put process. The Client (Chunk Source) evaluates all of the "Put Accept" responses and determines whether a "Rendezvous Transfer" is required. For example, if there were already sufficient replicas of the chunk to be put, then no Rendezvous Transfer would be required.

The criteria for "sufficient replicas" can vary with the usage of the present invention. For example some users may establish a policy that their content should have at least four replicas in at least two different failure domains, while others may simply require three replicas in three different failure domains. In a preferred embodiment, this flexibility to accommodate differing policies is enabled by making these determinations in a callback function to the upper layer.

In the example illustrated, the Rendezvous Transfer 3 (including the chunk payload) is multicast from the Client to the Rendezvous Group, which is a subset of the Negotiating Group. Hence, copies 3.1 of the Rendezvous Transfer 3 are shown as being received by each Server in the Rendezvous Group. Data fields in exemplary implementations of a Rendezvous Transfer message are described below in relation to FIG. 26. In the illustrated example, the first and third storage servers in the Negotiating Group indicated in their Put Accept response that they could not accept delivery now (i.e. returned Not Now messages), and therefore did not join the Rendezvous Group. The remaining storage servers in the Negotiating Group indicated in their Put Accept responses that they could accept delivery and so became members of the Rendezvous Group.

The recipients of the Rendezvous Transfers 3.1 respond by unicasting a Payload Acknowledgement ("Payload ACK") message to the Chunk Source. Data fields in exemplary implementations of a Payload ACK message are described below in relation to FIG. 27. In the illustrated example, the Payload ACK 4.1, 4.2, 4.3, 4.4, and 4.5 messages are sent, respectively, by the first, second, third, fourth, and fifth Servers in the Rendezvous Group. The Payload ACK 4.* (*=1, 2, ... , 5) messages are received by the sending Client (Chunk Source).

FIG. 8 illustrates the final step in the put process. The client collects the received Payload ACKs and forwards them to the Negotiating Group in one or more Relayed ACK message. As depicted, a Relayed ACK 5 message may be multicast from the Client such that a copy 5.1 of the Relayed ACK message is received by each Server in the Negotiating Group. The Relayed ACK message informs each Server in the Negotiating Group as to which Servers of the Rendezvous Group are to receive the chunk to be put.

Chunk Put Proposal—Cluster Consensus

Figure 9:
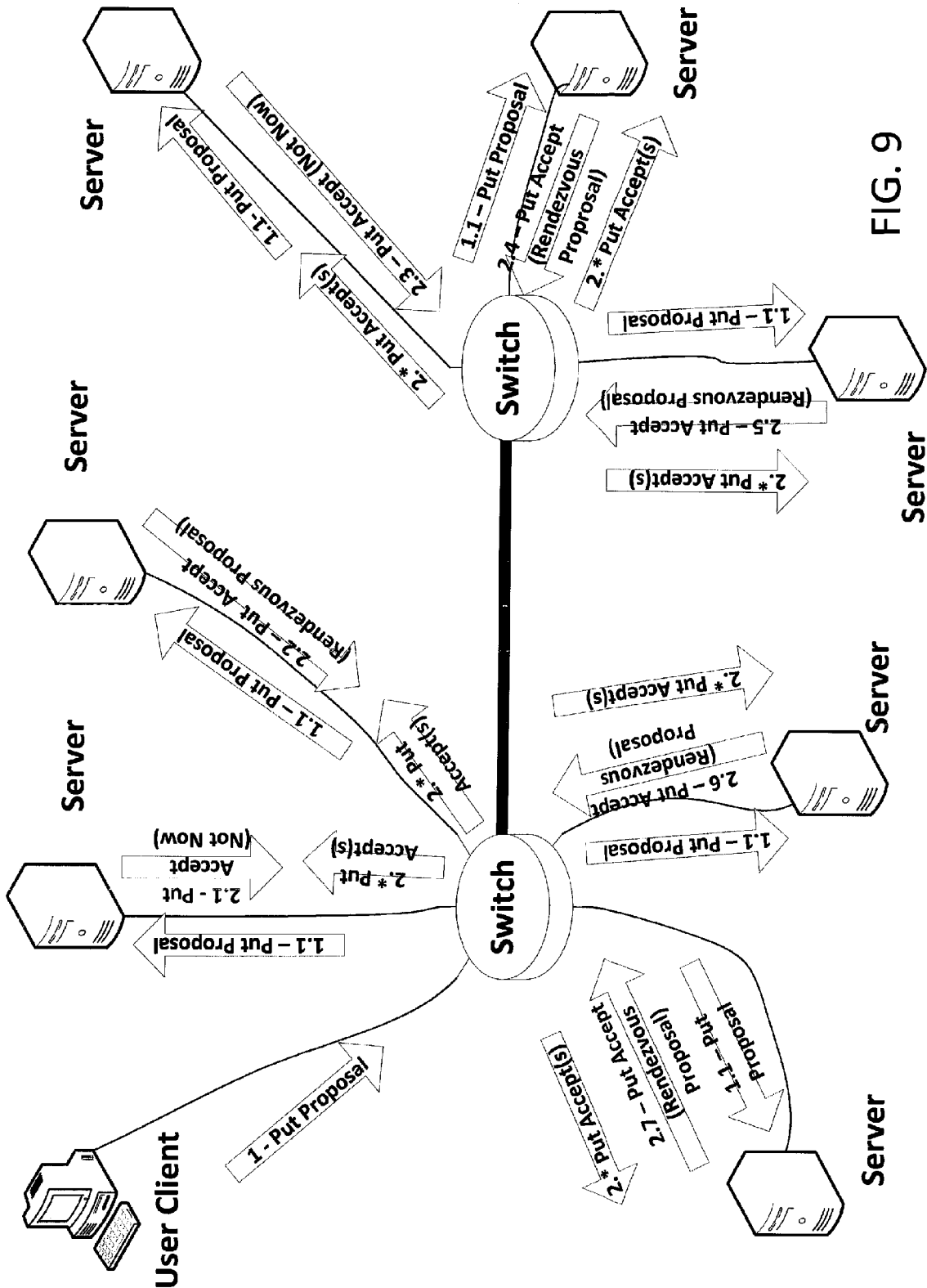
FIGS. 9-11 depict steps of a cluster-consensus-based procedure for proposing a chunk put to a distributed storage system in accordance with an embodiment of the invention.
Figure 10:
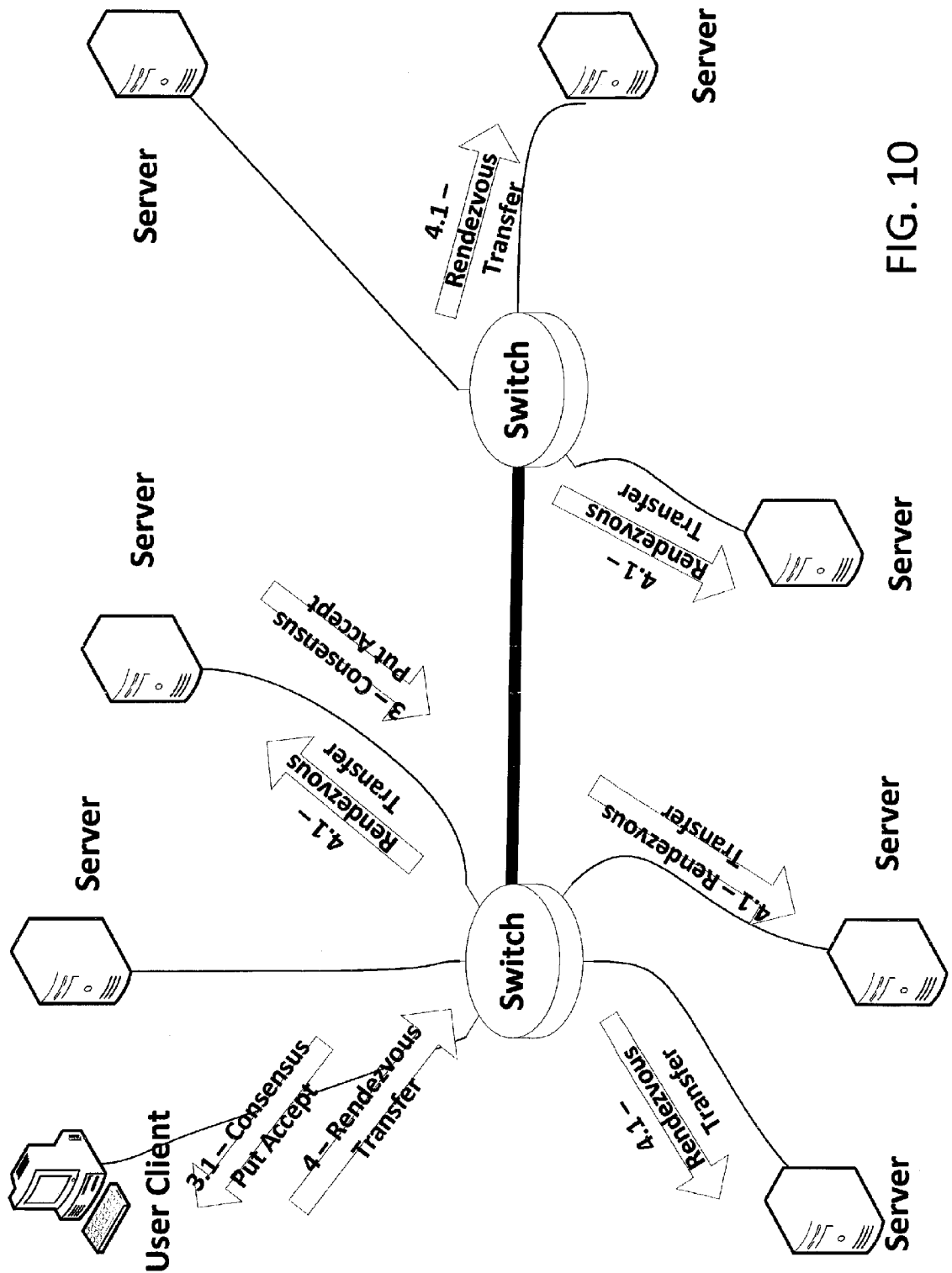
Figure 11:
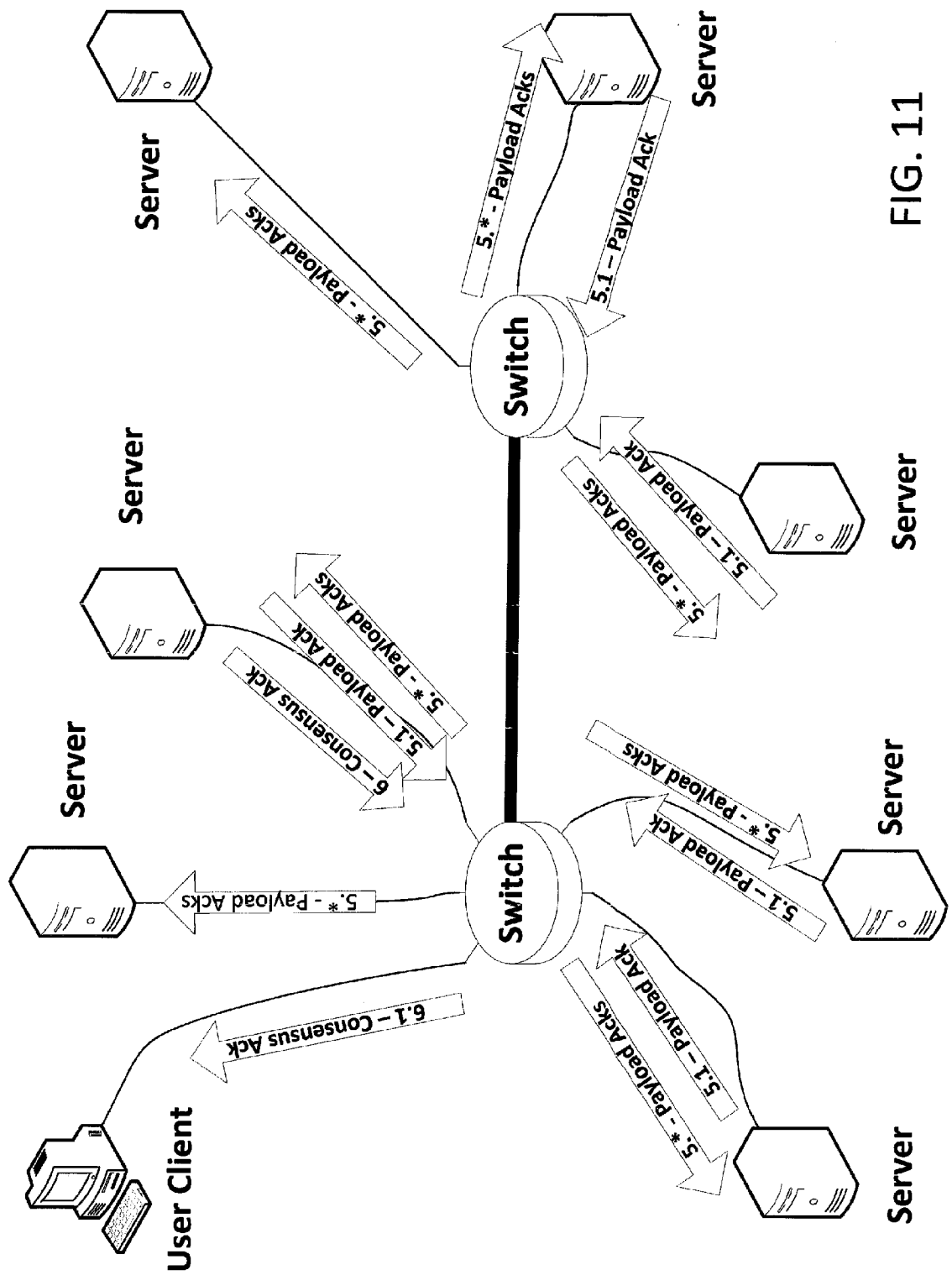

FIGS. 9-11 depict steps of a cluster-consensus-based procedure for proposing a chunk put to a distributed storage system in accordance with an embodiment of the invention. This cluster-consensus-based procedure has advantages over the serial transmission procedure of FIG. 4 and the relayed unicast transmission procedure of FIG. 5. In comparison to the serial transmission procedure, congestion on inbound links is avoided. In comparison to the relayed unicast transmission procedure, contention between the relay (put) traffic and get traffic is avoided.

In the illustrations of FIGS. 9-11, we will walk through a sequence of events for a put transaction with the cluster-consensus procedure. Before this sequence of events, the upper layers (above the replicast transport layer) have already specified a previously-provisioned multicast Negotiating Group and a previously-provisioned multicast Rendezvous Group.

In a first step shown, the Client multicasts a "Put Proposal" 1 to the Negotiating Group of Servers. The Switches may make a best effort attempt to deliver a copy 1.1 of the Put Proposal 1 to every member of the Negotiating Group. As with the client-consensus example, the Put Proposal will typically be delivered to each member of the Negotiating Group.

Each recipient of the Put Proposal responds by generating and sending a "Put Accept" message. As shown in FIG. 9, in this cluster-consensus variation of the distributed put protocol, each of the Put Accept messages is multicast to the other members of the Negotiating Group. As with the client-consensus variation previously described, each storage server is free to employ its own algorithm to generate its Put Proposal based, for example, upon its performance history, work queue depth, and the desirability of accepting more storage. In the illustrated example: the Put Accept 2.1 message sent by a first Server in the Negotiating Group is a Not Now message; the Put Accept 2.2 message sent by a second Server in the Negotiating Group is a Rendezvous Proposal message; the Put Accept 2.3 message sent by a third Server in the Negotiating Group is a Not Now message; and the Put Accept 2.4, 2.5, 2.6 and 2.7 messages sent, respectively, by a fourth, fifth, sixth, and seventh Servers in the Negotiating Group are Rendezvous Proposal messages. Each Server in the Negotiating Group receives the Put Accept 2.* (*=1, 2, . . . , 7) messages from the other members of the Negotiating Group.

The next steps in the put process are depicted in FIG. 10. Each member of the Negotiating Group evaluates the Put Accepts 2.* for the transaction. A consistent procedure may be applied during the evaluation by each member so as to concurrently determine which of them should take a specific action. One of various conventional procedures may be used for this purpose. For example, one compatible procedure involves electing a lead member (the leader) to be the first-listed designated member of the Negotiating Group that intends to accept the transfer. When no member intends to accept the transfer, it may be the first-listed designated member of the Negotiating Group, even though that member does not intend to accept. However selected, the selected Server in the Negotiating Group may multicast the Consensus Put Accept 3 to the Client. Hence, a copy 3.1 of the Consensus Put Accept 3 is shown as being received by the Client.

As with the Client-Consensus procedure, the selection process may accommodate a variety of user policies. The only requirement is that the evaluation procedures on the various members of the Negotiating Group do not derive solutions that conflict with each other. In a preferred embodiment, a callback to the upper layer is used to enable this policy flexibility.

At a specified time, or within a specified window of time, the Client performs the Rendezvous Transfer 4 (including sending the chunk payload) to the Rendezvous Group. Hence, a copy 4.1 of the Rendezvous Transfer 4 is shown as being received by each Server that is a member of the Rendezvous Group.

The final steps of the put process are depicted in FIG. 11. Each recipient of the Rendezvous Transfer 4.1 multicasts a Payload ACK 5.1 message to the Rendezvous Group. In addition, the previously-selected leader of the Rendezvous Group unicasts a Consensus ACK 6 message to the Client.

Chunk Put Proposal with Deduplication—Client Consensus

Figure 12:
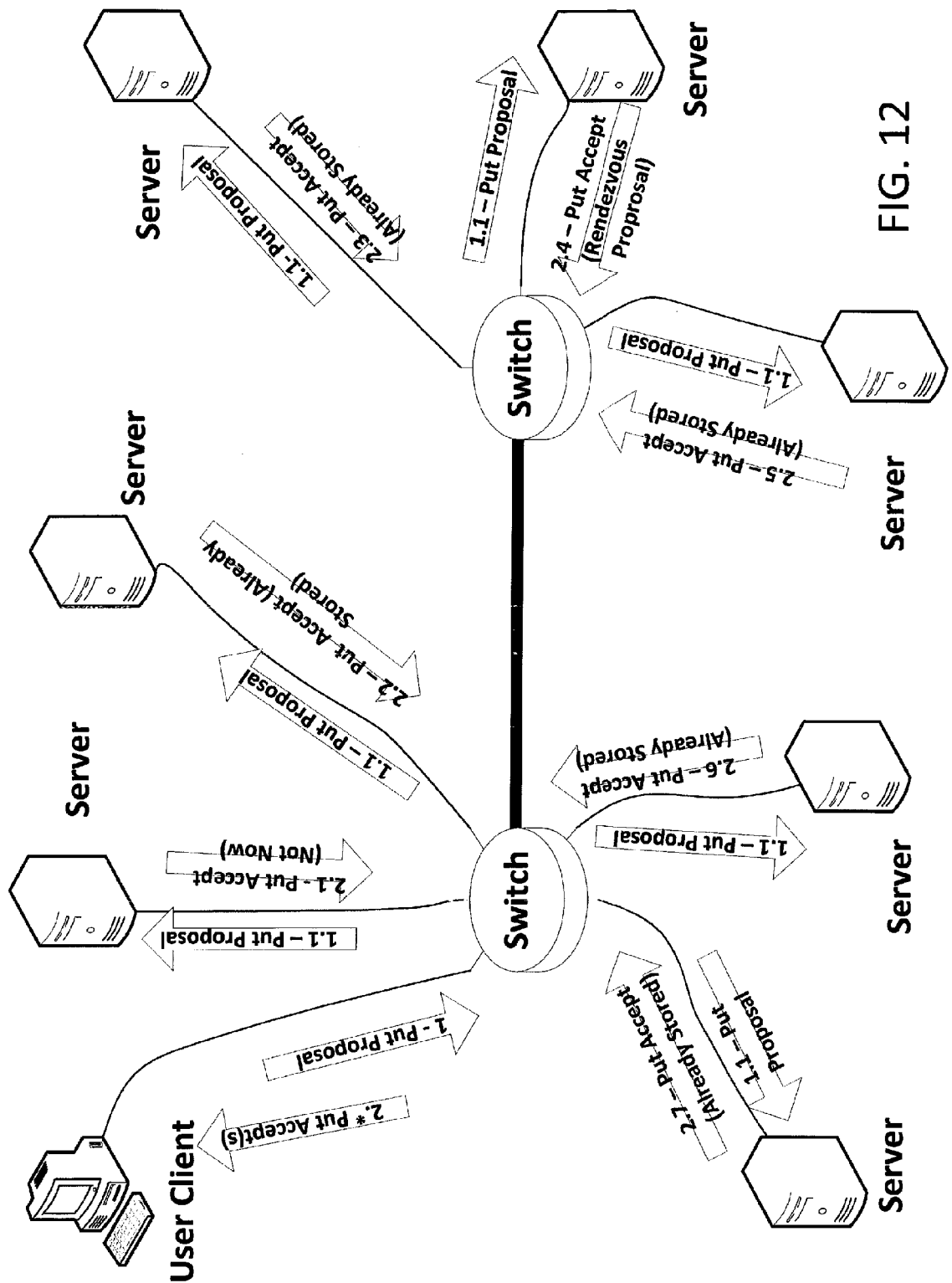
FIGS. 12 and 13 depict steps of a client-consensus-based procedure for proposing a chunk put to a distributed storage system with de-duplication in accordance with an embodiment of the invention.
Figure 13:
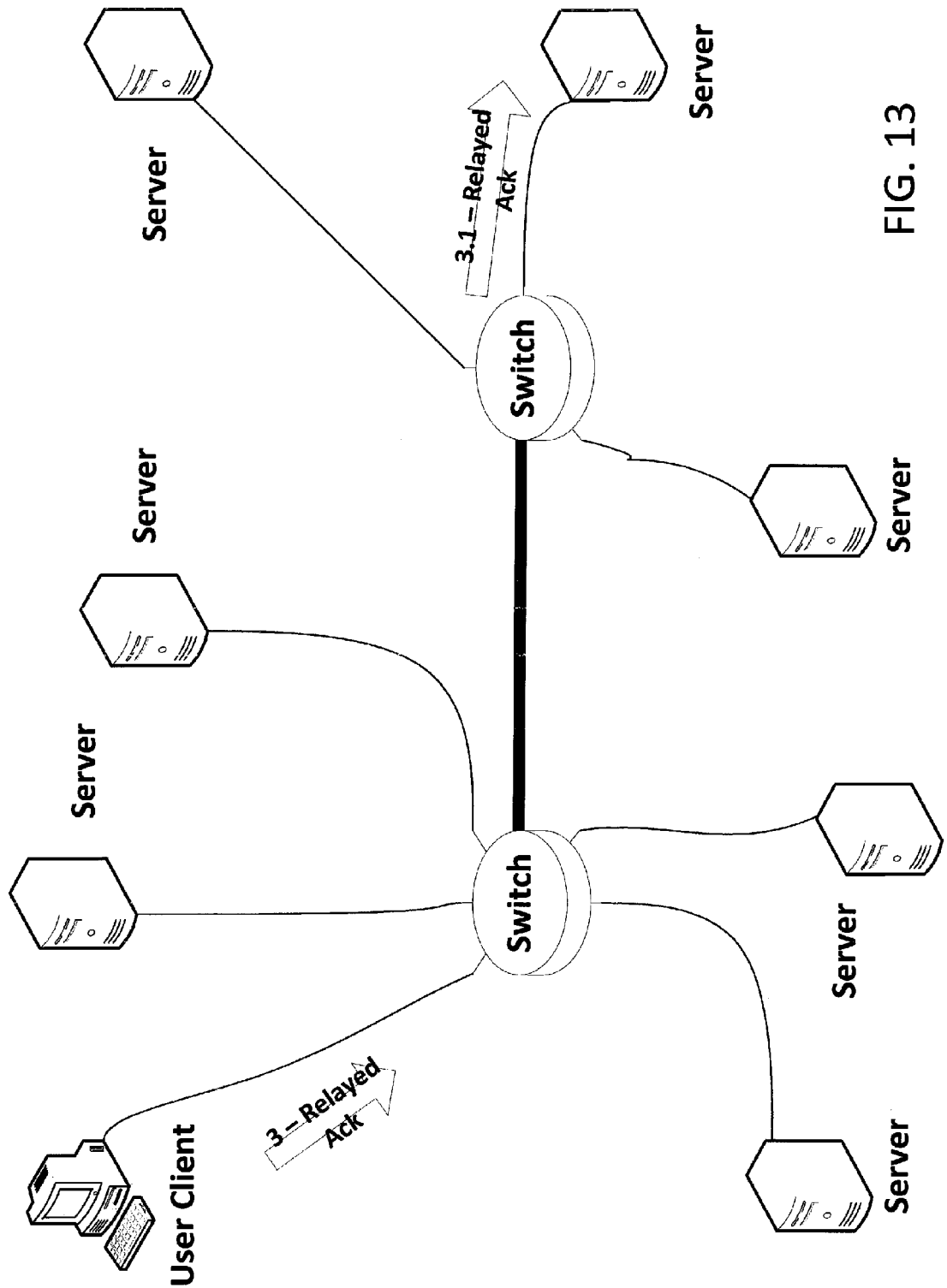

FIGS. 12 and 13 depict steps of a client-consensus-based procedure for proposing a chunk put to a distributed storage system with de-duplication in accordance with an embodiment of the invention.

The steps shown in FIG. 12 are similar to the steps discussed above in relation to FIG. 6. However, the system of FIG. 12 has de-duplication, and the chunk to be put is already stored on a number of storage servers in the illustrated example. In particular, the chunk to be put is already stored on the second, third, fifth, sixth and seventh Servers. Hence, the second, third, fifth, sixth and seventh Servers respond to the Put Proposal 1.1 with Put Accept messages (2.2, 2.3, 2.5, 2.6 and 2.7, respectively) that indicate that the chunk to be put is "Already Stored" at that server.

The Client (Chunk Source) receives the Put Accept 2.* (where *=1, 2, 3, . . . , 7) messages. From the number of "Already Stored" responses among the Put Accept messages, the Client is able to determine, in this example, that the chunk to be put is already stored on a sufficient number of storage servers. Hence, in this case, no rendezvous transfer is required. Since no rendezvous transfer is required, the Client may send a Relayed ACK 3 message to the members of the Rendezvous Group, as depicted in FIG. 13. The Relayed ACK message indicates to the members of the Rendezvous Group that there were sufficient replicas already stored, so no new replicas need to be created.

Chunk Put Proposal with Deduplication—Cluster Consensus

Figure 14:
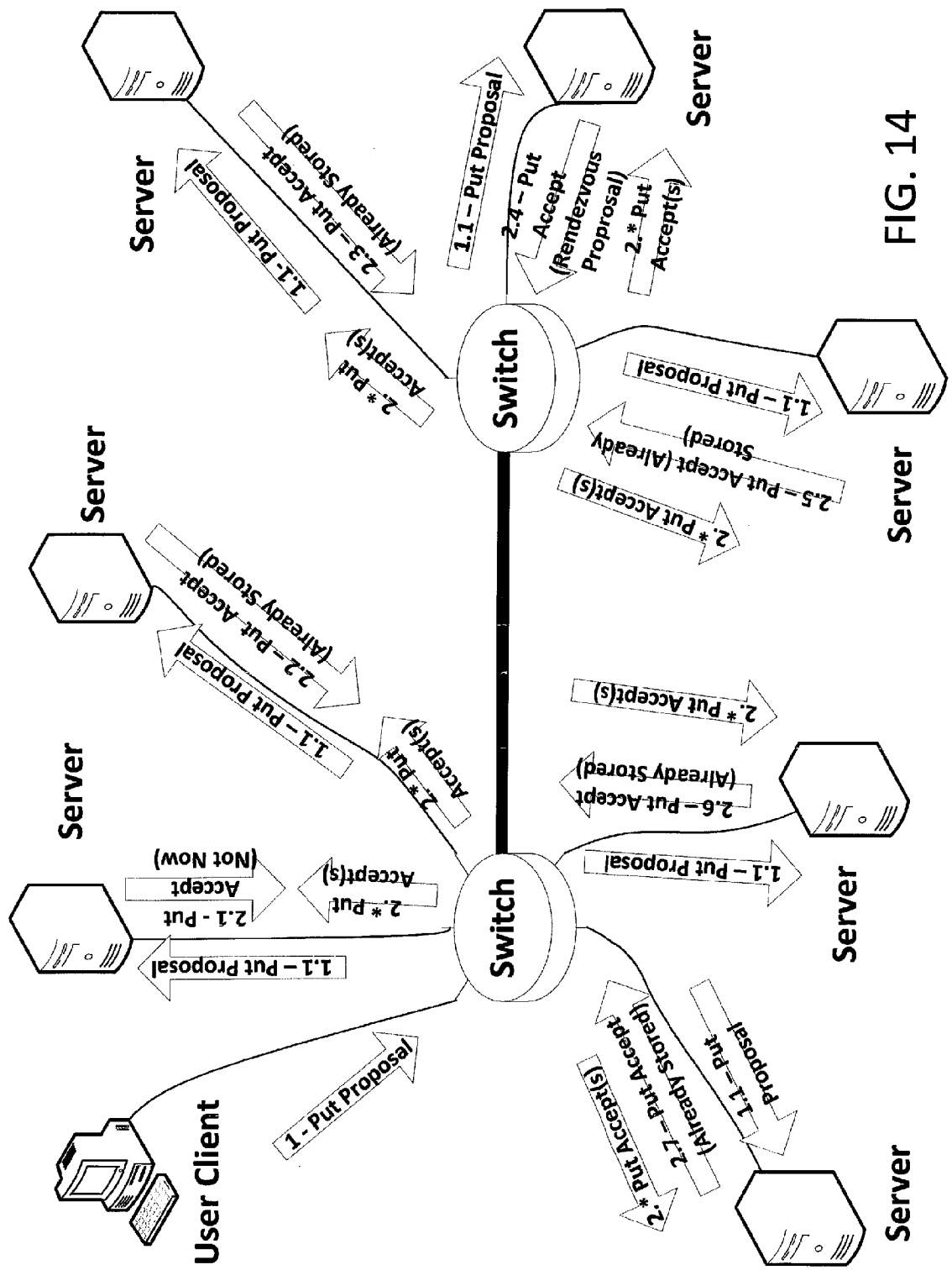
FIGS. 14 and 15 depict steps of a cluster-consensus-based procedure for proposing a chunk put to a distributed storage system with de-duplication in accordance with an embodiment of the invention.
Figure 15:
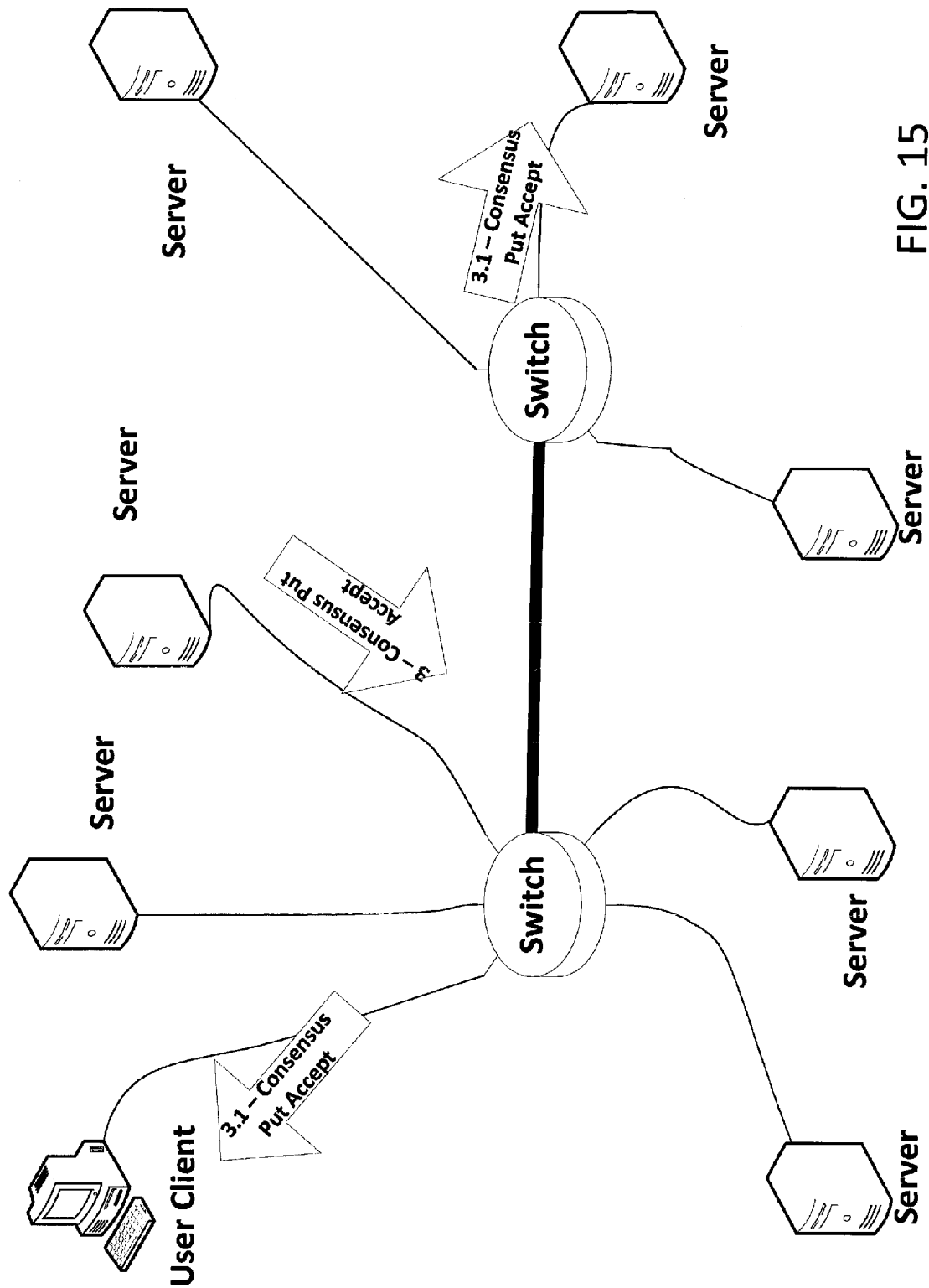

FIGS. 14 and 15 depict steps of a cluster-consensus-based procedure for proposing a chunk put to a distributed storage system with de-duplication in accordance with an embodiment of the invention.

The steps shown in FIG. 14 are similar to the steps discussed above in relation to FIG. 9. However, the system of FIG. 14 has de-duplication, and the chunk to be put is already stored on a number of storage servers in the illustrated example. In particular, the chunk to be put is already stored on the second, third, fifth, sixth and seventh Servers. Hence, the second, third, fifth, sixth and seventh Servers respond to the Put Proposal 1.1 with Put Accept messages (2.2, 2.3, 2.5, 2.6 and 2.7, respectively) that indicate that the chunk to be put is "Already Stored" at that server.

Each Server of the Negotiating Group receives the Put Accept 2.* (where *=1, 2, 3, . . . , 7) messages. In this example, from the number of "Already Stored" responses among the Put Accept messages, each Server is able to determine independently that the chunk to be put is already stored on a sufficient number of storage servers such that no rendezvous transfer is required. In this case, the leader may transmit a Consensus Put Accept 3 which is received (as Consensus Put Accept 3.1) by the Client (Chunk Source), as depicted in FIG. 15. The Consensus Put Accept 3.1 indicates to the Client that there were sufficient replicas already stored, so no new replicas need to be created.

Chunk Get—Client Consensus

Figure 16:
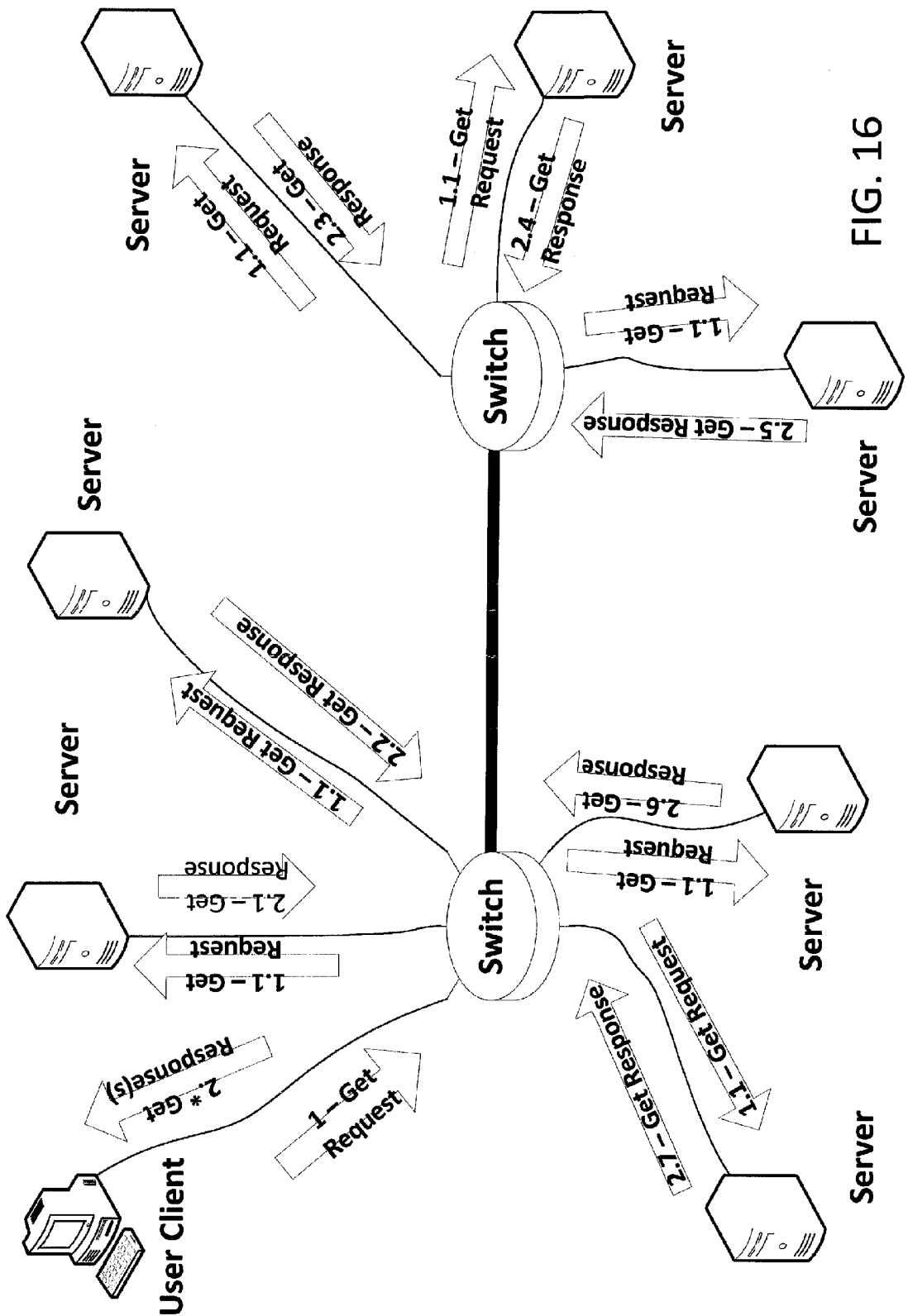
FIGS. 16 and 17 depict steps of a client-consensus-based procedure for requesting a chunk get from a distributed storage system in accordance with an embodiment of the invention.
Figure 17:
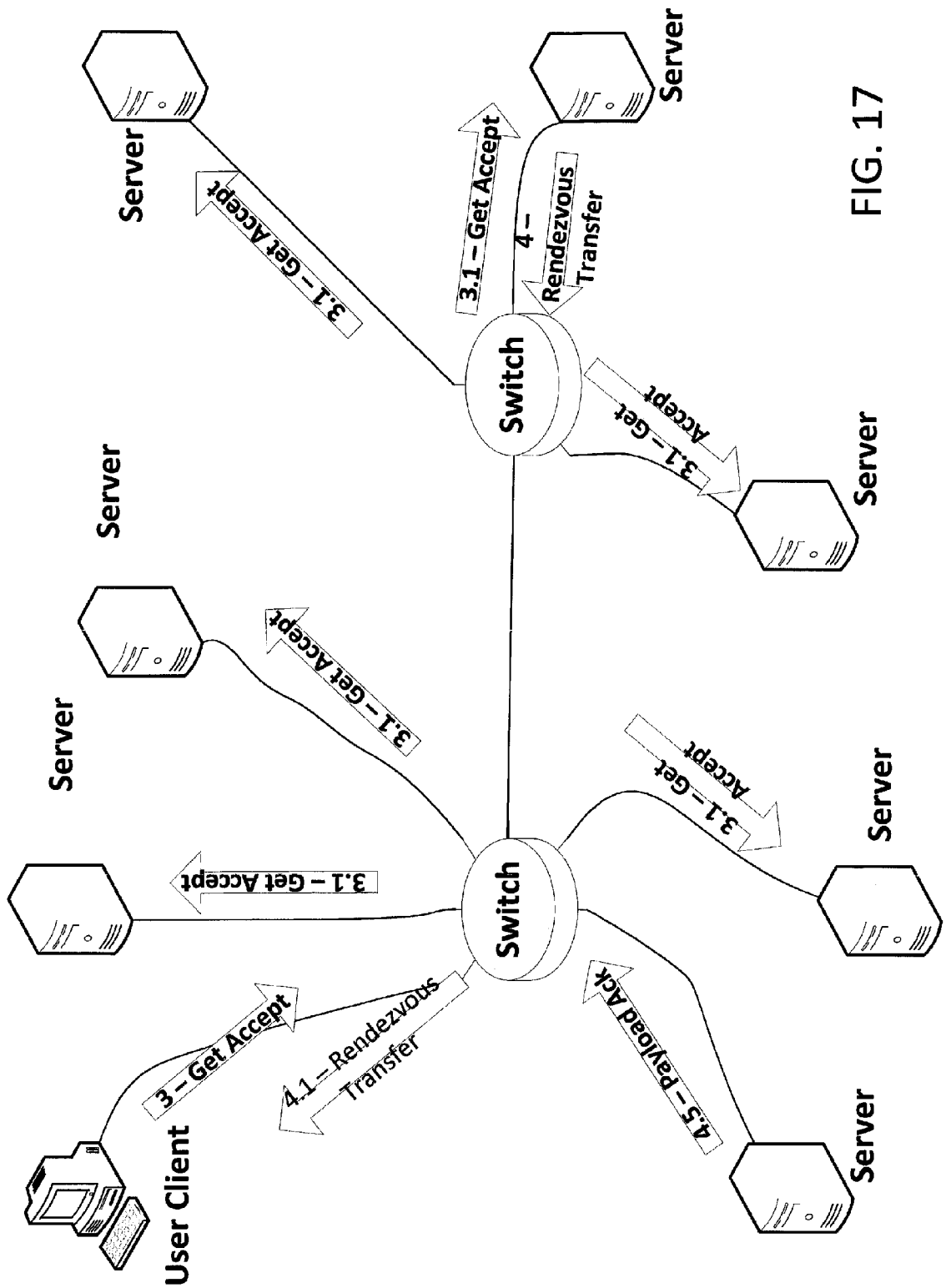

FIGS. 16 and 17 depict steps of a client-consensus-based procedure for requesting a chunk get from a distributed storage system in accordance with an embodiment of the invention. Before this sequence of events, an upper layer (i.e. a layer above the Replicast transport layer) has already specified a previously-provisioned multicast Negotiating Group and a previously-provisioned multicast Rendezvous Group.

Note that, for a chunk get transaction, the specified Rendezvous Group is one that has been joined by the Client, or an agent acting on behalf of the Client. Typically, the Client (or its agent) will have previously joined several provisioned Rendezvous Groups for previous transactions and so one of these previously-joined Rendezvous Groups may be specified.

As depicted in FIG. 16, the Client may multicast, in step 1, a Get Request 1 to the Negotiating Group. The Switches of the system then forward the Get Request 1.1 to Servers that are members of the Negotiating Group.

Each Server in the Negotiating Group then generates and unicasts a Get Response to the Client in response to the Get Request 1.1. This response may be generated using an algorithm that factors in the current work queue depths, the performance history of the devices to be used, and other factors to derive its best estimate of earliest delivery time. However, there is no requirement that this algorithm be uniform across all storage servers. In other words, multiple different algorithms may be used by the storage servers. In the illustrated example: Get Response 2.1 is unicast by the first Server; Get Response 2.2 is unicast by the second Server; Get Response 2.3 is unicast by the third Server; . . . ; and Get Response 2.7 is unicast by the seventh Server. The Get Responses 2.* (where *=1, 2, 3, . . . , 7) are received by the Client.

The Client analyzes the Get Responses 2.* to determine which Server corresponds to the best response. As shown in FIG. 17, the Client then multicasts a Get Accept 3 to the Negotiating Group. The Get Accept 3 specifies which Get Response will be accepted (i.e. which Server is selected to provide the chunk). Each Server in the Negotiating Group receives a copy 3.1 of the Get Accept 3. Upon receiving the Get Accept, the selected Server may initiate a multicast Rendezvous Transfer 4 to the Rendezvous Group, which in this case consists solely of the Client. The Client thus receives a copy 4.1 of the Rendezvous Transfer 3 and so obtains the desired chunk.

Chunk Get—Cluster Consensus

Figure 18:
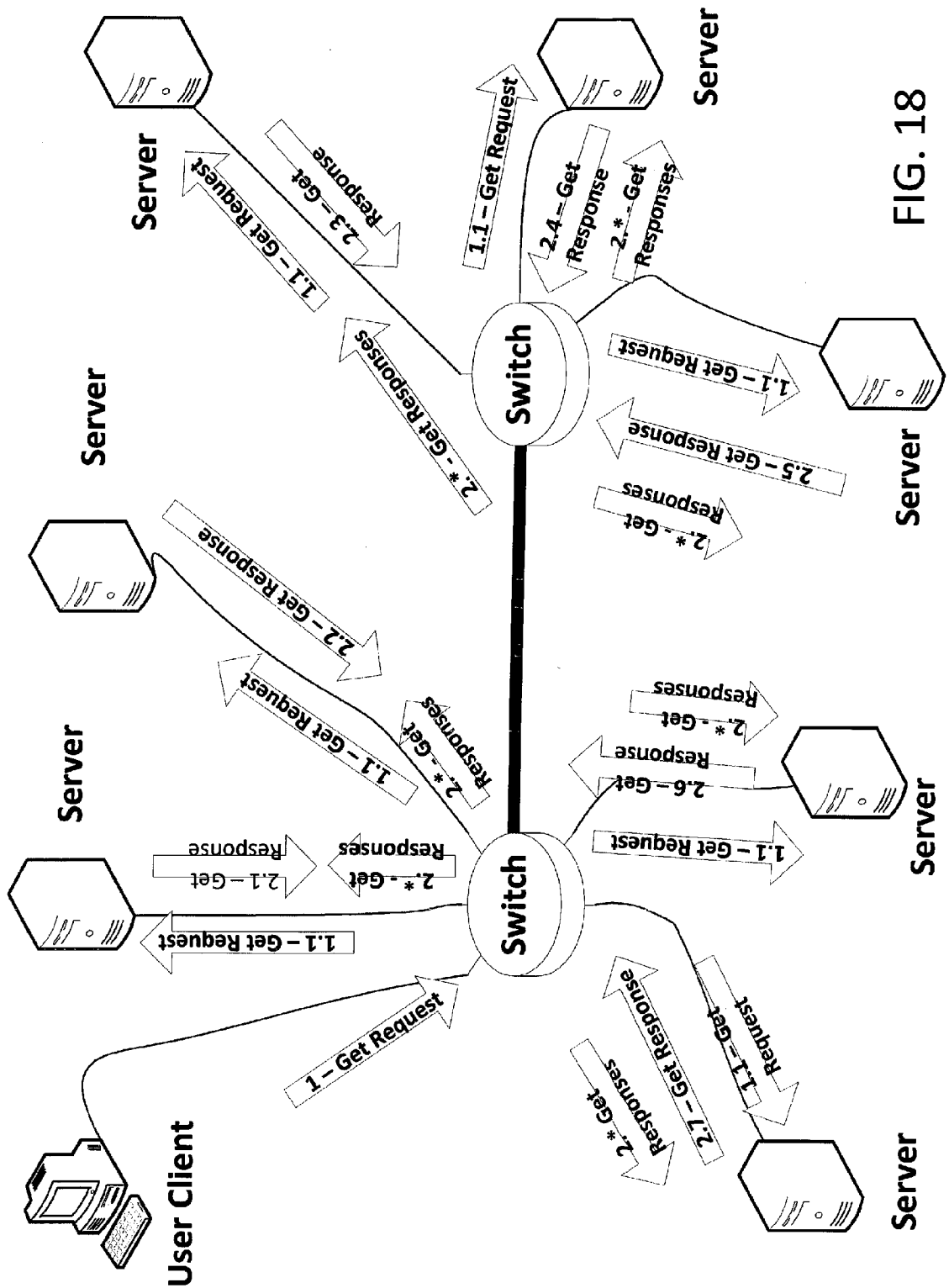
FIGS. 18 and 19 depict steps of a cluster-consensus-based procedure for requesting a chunk get from a distributed storage system in accordance with an embodiment of the invention.
Figure 19:
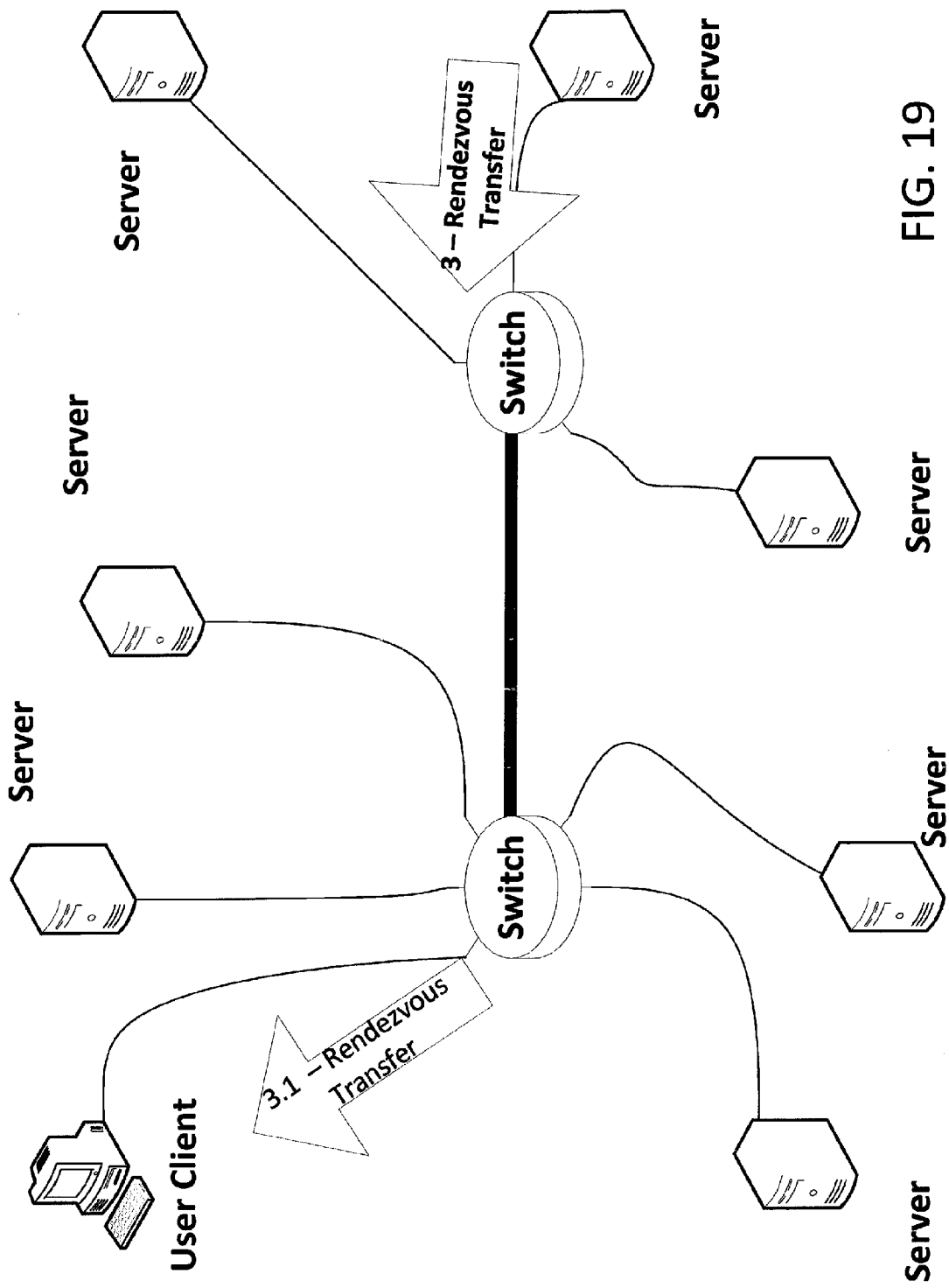

FIGS. 18 and 19 depict steps of a cluster-consensus-based procedure for requesting a chunk get from a distributed storage system in accordance with an embodiment of the invention. Before this sequence of events, an upper layer (i.e. a layer above the Replicast transport layer) has already specified a previously-provisioned multicast Negotiating Group and a previously-provisioned multicast Rendezvous Group.

Note that, for a chunk get transaction, the specified Rendezvous Group is one that has been joined by the Client, or an agent acting on behalf of the Client. Typically, the Client (or its agent) will have previously joined several provisioned Rendezvous Groups for previous transactions and so one of these previously-joined Rendezvous Groups may be specified.

As depicted in FIG. 18, the Client may multicast, in step 1, a Get Request 1 to the Negotiating Group. The Switches of the system then forward the Get Request 1.1 to Servers that are members of the Negotiating Group.

In response to the Get Request 1.1, each Server generates and multicasts a Get Response to the other Servers in the Negotiating Group. This response may be generated using an algorithm that factors in the current work queue depths, the performance history of the devices to be used, and other factors to derive its best estimate of earliest delivery time. However, there is no requirement that this algorithm be uniform across all storage servers. In other words, multiple different algorithms may be used by the storage servers. In the illustrated example: Get Response 2.1 is multicast by the first Server; Get Response 2.2 is multicast by the second Server; Get Response 2.3 is multicast by the third Server; . . . ; and Get Response 2.7 is multicast by the seventh Server. Each Server in the Negotiating Group receives the Get Responses 2.* (where *=1, 2, 3, . . . , 7) from the other Servers in the Negotiating Group.

Each Server in the Negotiating Group analyzes the Get Responses 2.* to determine which Server corresponds to the best response. As shown in FIG. 19, the one Server that corresponds to the best response initiates a multicast Rendezvous Transfer 3 to the Rendezvous Group, which in this case consists solely of the Client. The Client thus receives a copy 3.1 of the Rendezvous Transfer 3 and so obtains the desired chunk.

Chunk Get—Cluster Consensus with Additional Target

Figure 20:
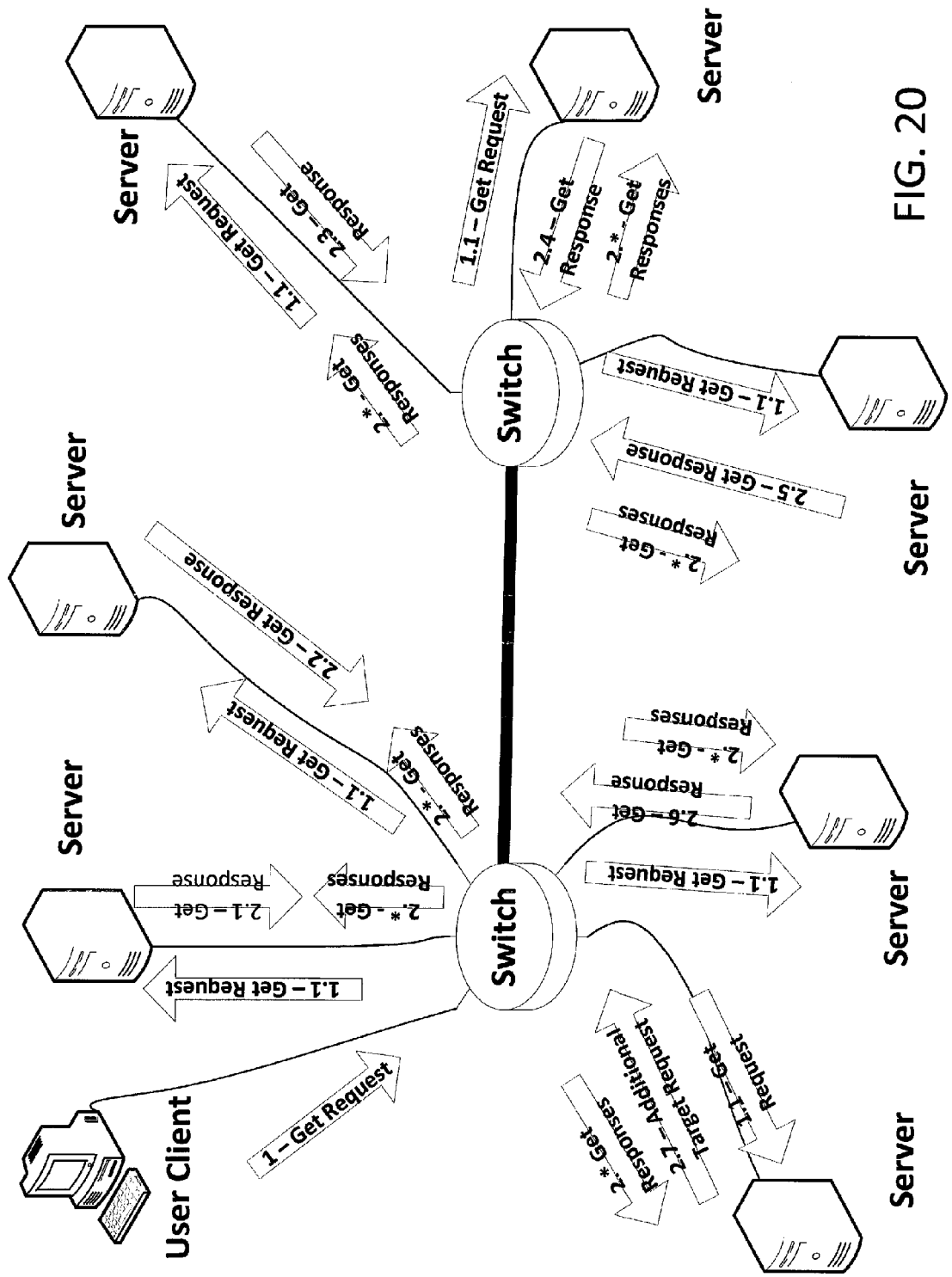
FIGS. 20 and 21 depict steps of a cluster-consensus-based procedure for requesting a chunk get from a distributed storage system where an additional target is requested in accordance with an embodiment of the invention.
Figure 21:
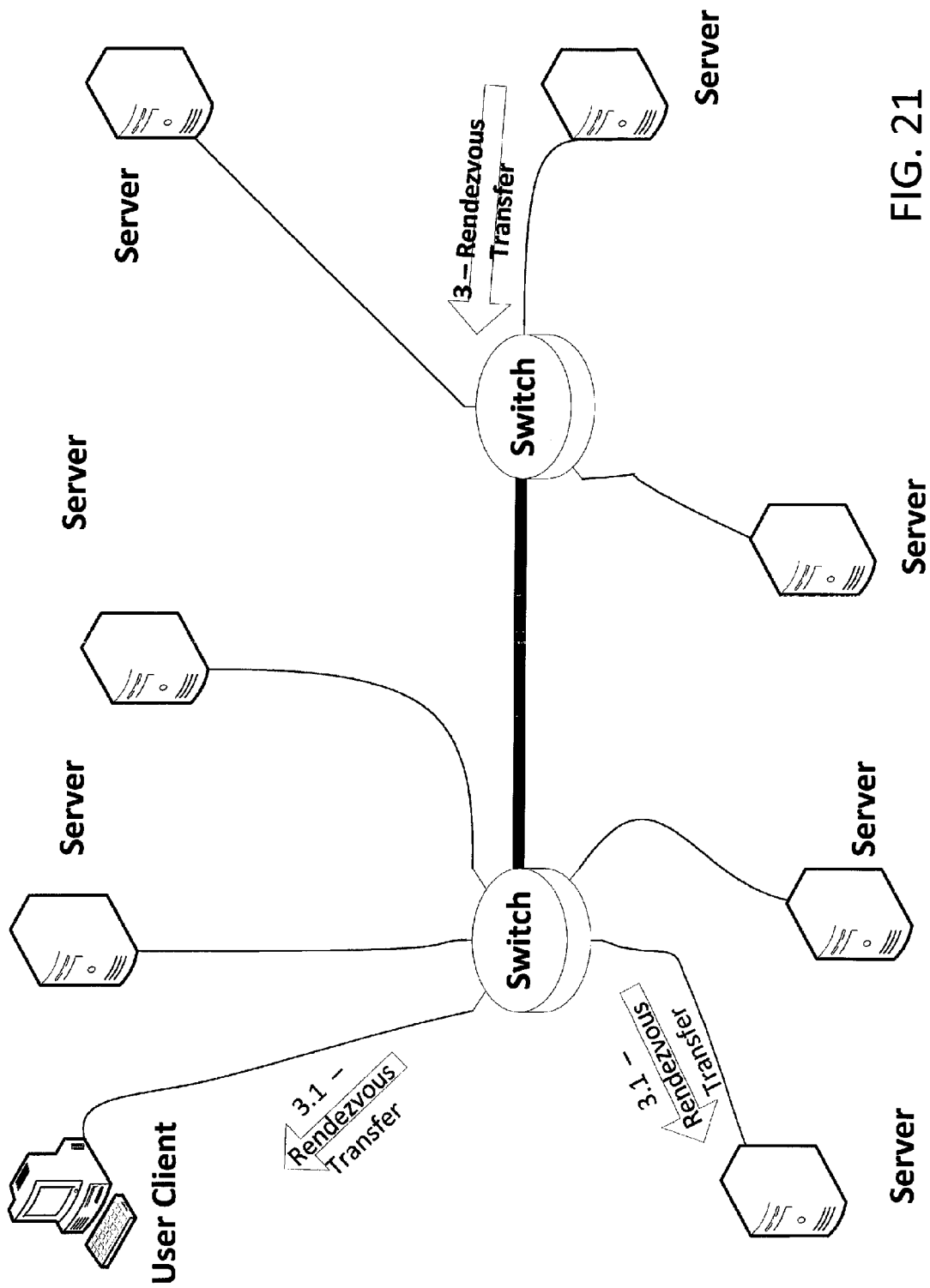

FIGS. 20 and 21 depict steps of a cluster-consensus-based procedure for requesting a chunk get from a distributed storage system where an additional target is requested in accordance with an embodiment of the invention.

As depicted in FIG. 20, the Client may multicast, in step 1, a Get Request 1 to the distributed storage system. The Switches of the system then forward the Get Request 1.1 to Servers that are members of the Negotiating Group.

In response to the Get Request 1.1, each of the Servers generates and multicasts either a Get Response to the other Servers in the Negotiating Group. In the illustrated example: Get Response 2.1 is multicast by the first Server; Get Response 2.2 is multicast by the second Server; Get Response 2.3 is multicast by the third Server; . . . ; Get Response 2.6 is multicast by the sixth Server; and Get Response 2.7 is multicast by the seventh Server. In this case, the Get Response 2.7 from the seventh Server is an Additional Target Request 2.7.

The Additional Target Request 2.7 is a request for the seventh Server be added to the Rendezvous Group. Hence, the Additional Target Request creates an additional replica by "piggy-backing" on a get transaction using the client-consensus procedure. The Additional Target Request 2.7 may be generated by the seventh Server because it does not currently have a copy of the requested chunk. In other words, the Additional Target Request is effectively a Get Response that tells the other members of the Negotiating Group that this storage server cannot respond to this get request, but would like to do so in the future, so it will be subscribing to the Rendezvous Group to get a replica of the chunk.

Each Server in the Negotiating Group receives the Get Responses (including Additional Target Requests) 2.* (where *=1, 2, 3, . . . , 7) from the other Servers in the Negotiating Group. Each Server in the Negotiating Group analyzes the Get Responses (including Additional Target Requests) 2.* to determine which Server corresponds to the best response. As shown in FIG. 21, the one Server that corresponds to the best response initiates a multicast Rendezvous Transfer 3 to the Rendezvous Group, which in this case consists of the Client plus the seventh Server. The Client and the seventh Server thus each receives a copy 3.1 of the Rendezvous Transfer 3 and so obtains the desired chunk.

Exemplary Encoding Structures

This section will describe an exemplary set of packets that are one possible encoding of the operations described herein. The examples shown assume use of actual L3 multicast addresses.

Figure 22:
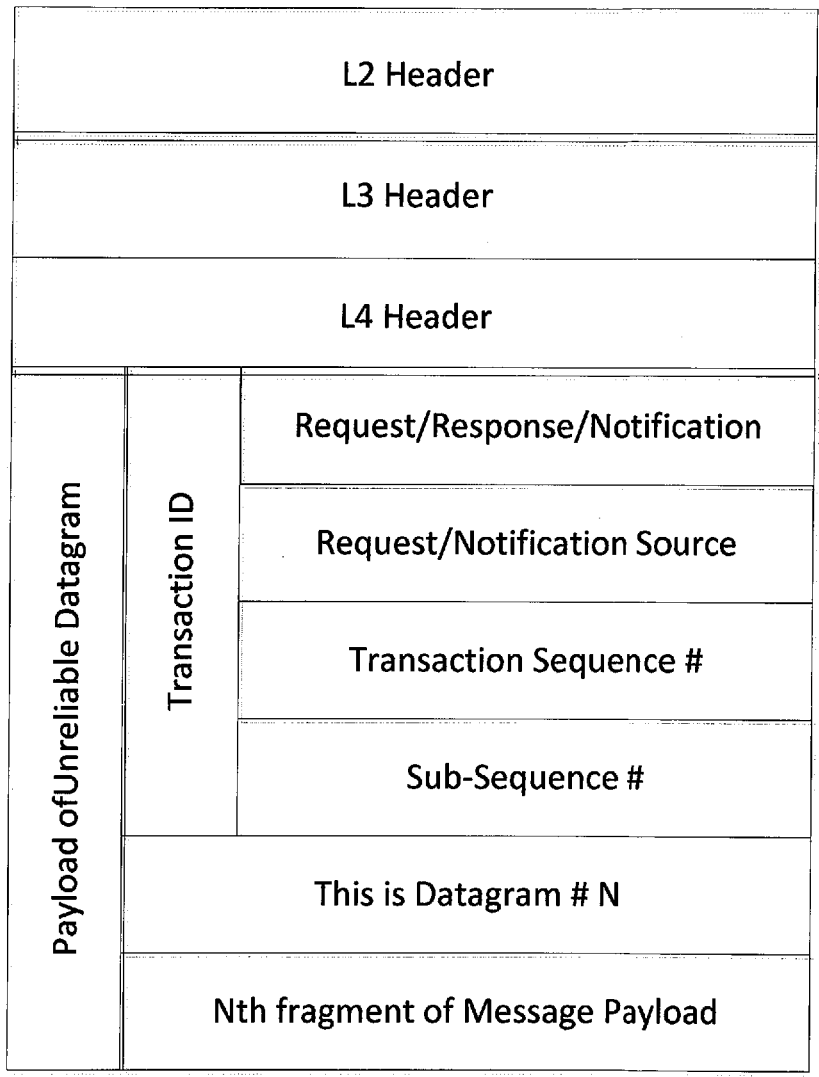
FIGS. 22 and 23 depict a possible encoding of a generic "Replicast" message over L2 frames.
Figure 23:
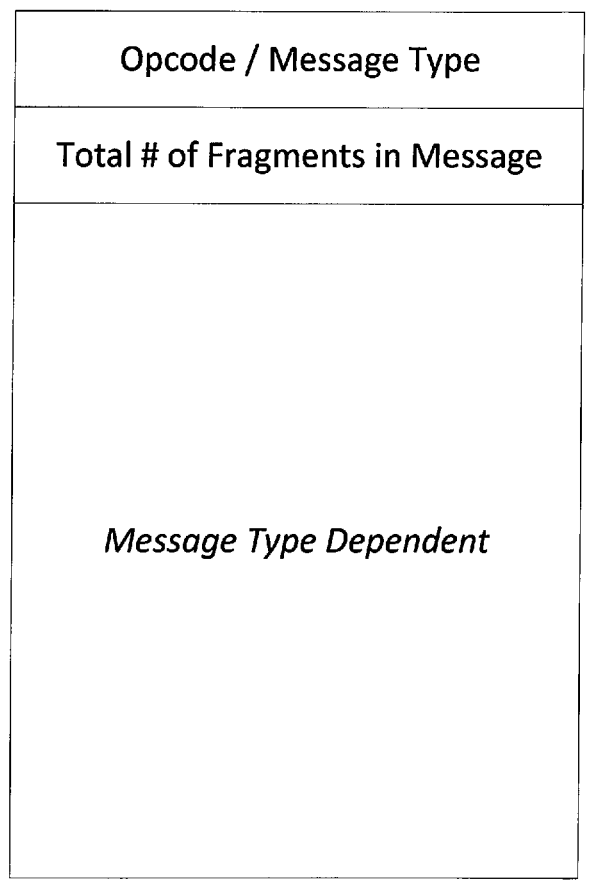

FIGS. 22 and 23 depict a possible encoding of a generic "Replicast" message over L2 frames. As shown, each L2 frame may contain the standard L2 Header, L3 Header and L4 Header. Typically, these may be Ethernet, IP and UDP headers.

The Message (Msg) Sequence number would identify a unique message within the context of a source. The source would be identified by the L3 and L4 source addresses. Multipathing could associate multiple source addresses into a multipath session, but this association would not typically be re-iterated in each L2 frame.

The Fragment # indicates which L2 frame of the total sequence within a message this is. For the first fragment the following attributes would be encoded:
The total number of fragments.
The Message Type.
The Message Length The Message Payload would then be encoded over multiple L2 frames, each with incrementing Fragment #s. In accordance with an embodiment of the invention, the Message Payload may comprise a fragment of a "Replicast" protocol message as described herein.

Finally, in the last fragment, a validator (Msg Checksum) would be included covering the entire Msg Payload, including portions delivered as Unsolicited payload as part of the setup command. This may be a CRC-32c checksum or better. Including a "Layer 5" checksum is a protection against incorrectly ordered fragments. L2 and L4 already provide protection against corrupt transmissions.

In some embodiments of the present invention, a Msg Checksum may cover only the metadata fields because the Content Hash Identifier already validates the payload.

As shown in FIG. 22, the Payload of the Unreliable Datagram may include a transaction identifier (transaction ID). The transaction ID may include sub-fields that indicate: 1) whether the message is a request, response or notification (Request/Response/Notification); 2) the source of the request or notification (Request/Notification Source); 3) a transaction sequence number (Transaction Sequence #); and 4) a sub-sequence number (Sub-Sequence #). The payload may further include an indication of which fragment of the message payload is being carried (This is Datagram #N). Finally, the payload includes the Nth fragment of the message payload.

As further shown in FIG. 22, the Payload of the Unreliable Datagram also includes the "Nth fragment of Message Payload." In accordance with an embodiment of the invention, the Message Payload may be a Replicast message. An exemplary encoding structure for a generic Replicast message is shown in FIG. 23. Note that the exemplary encoding structure of FIG. 23 may be, in effect, inserted into the Nth Fragment of Message Payload field of FIG. 22.

The structure shown in FIG. 23 includes the following fields: a first field that indicates the opcode or message type; a second field that indicates that total number of fragments in the message; and a third field that is message type dependent. As a couple of examples, the opcode or message type may indicate whether the message is a chunk put proposal, or a chunk put accept. Other message types may be indicated, of course. The Message Type Dependent field (i.e. the third field) includes sub-fields that depend on the message type (i.e. the first field).

Exemplary message types are described below. These message types include: Put Proposals (FIG. 24); Put Accepts (FIG. 25); Rendezvous Transfers (FIG. 26); Payload ACKs and NAKs (FIG. 27); Get Requests (FIG. 28); and Get Responses (FIGS. 29 and 30).

Put Proposals

A Multicast Chunk Put Proposal would have source addresses for L2 through L4 reflecting the network interface being used to send the message. The L3 destination address would be the Multicast Address of the Negotiating Group (typically from the Distributed Hash Allocation Table). The L4 destination port would be a port number assigned for use by this protocol either by a local network administrator or a numbering authority such as IANA (Internet Assigned Numbering Authority).

FIG. 24 depicts exemplary encoding structures for chunk put proposal messages in accordance with an embodiment of the invention. The exemplary encoding structure on the left shows a structure for a named Chunk Put Proposal message, while the exemplary encoding structure on the right shows a structure for an unnamed Chunk Put Proposal message. For example, in Nexenta's Cloud Copy on Write™ object storage system (which will be commercially available from Nexenta Systems of Santa Clara, Calif.), a Named Chunk may correspond to a "version manifest" chunk, and an Unnamed Chunk may correspond to a content chunk. Note that these structures may be, in effect, inserted into the Message Type Dependent field of FIG. 23.

A multicast Chunk Put Proposal may provide at least the following information:

1) The Source of the Chunk Put Proposal. This may be a network address currently assigned to the port or a permanent identifier of the server independent of current network assigned addresses. (See, for example, the source addresses in the L2 through L4 headers of FIG. 22.)
2) A Proposal sequence number that will be incremented for each Chunk Put Proposal sent by a given source. As with all sequence numbers used in networking protocols, it must have sufficient span than the vast majority of sequence numbers are not currently in use. (See, for example, the "Transaction Sequence #" and "Sub-Sequence #" fields of FIG. 22.)
3) An Identifier of the target Negotiating Group. (See, for example, Target Negotiating Group in FIG. 24.)
4) An enumerator specifying the Type of Chunk Put. This enumerator is not intended to be meaningful to the transport layer, only to the storage layer. For example, with Nexenta's Cloud Copy on Write™ object storage system (which is commercially available from Nexenta Systems of Santa Clara, Calif.), the types may be Payload Chunks, Sub-manifests and Version Manifests. (See, for example, Opcode/Message Type in FIG. 23.)
5) The Content Hash ID for the chunk. (See Chunk Hash ID field in FIG. 24.)
6) If this is a Named Chunk, the Name Hash ID. (See, for example, Bucket Hash ID, Name Hash ID, and Unique Version Identifier under the Named Chunk Put Proposal Message in FIG. 24.)
7) The total length of the compressed payload that will be put. (See, for example, "Length of non-volatile content" in FIG. 24.)
8) The total length of the above content that will be put immediately using unsolicited bandwidth, typically in an optional portion in this message. (See, for example, "Length of above included in the Put Proposal message" in FIG. 24.)
9) The multicast address for a Rendezvous Group that will be used to put the payload. The members of the Rendezvous Group are not specified because they have not been selected yet. (See, for example, the "Delivery Group" in FIG. 24.)
10) The maximum desired delivery rate. This would typically be expressed as the total bandwidth required, e.g. bits or bytes per second rather than messages per second. (See, for example, the Maximum Delivery Rate in FIG. 24.)

In the typical case, where a portion of the payload will be delivered using bandwidth from a Reserved traffic class, each recipient of the Chunk Put Proposal will respond with a Chunk Put Accept.

Put Accepts

A Put Accept is preferably addressed to the Multicast Address of the Rendezvous Group. An embodiment of the present invention may allow a Put Accept to be unicast addressed to the request sender.

FIG. 25 depicts exemplary encoding structures for chunk Put Accept messages in accordance with an embodiment of the invention. (Note that a "Put Accept" message may also be referred to herein as a "Chunk Accept" message.) The exemplary encoding structure on the left shows a structure for a Put Accept message that provides a Proposed Rendezvous. The exemplary encoding structure in the middle shows a structure for a Put Accept message that indicates Content Already Stored (for systems with deduplication). The exemplary encoding structure in the middle shows a structure for a Put Accept message that indicates Not Now. Note that these structures may be, in effect, inserted into the Message Type Dependent field of FIG. 23.

A multicast chunk Put Accept message may encode the following information:

1) The identity of the Multicast Chunk Put Proposal it is responding to: the source identifier of the request and the sequence number from that request. (See, for example, the Copy of Put Proposal ID in FIG. 25.)
2) The Target Negotiating Group as specified in the original put proposal. (See, for example, the Target Negotiating Group in FIG. 25.)
3) One of the following three responses:
   a) Chunk already stored. (See, for example, the Chunk Accept Message—Content Already Stored structure in middle of FIG. 25.) In this case, redundant transmission of the chunk payload is not required.
   b) Put Proposal Not Accepted. (See, for example, the Chunk Accept Message—Not Now structure on right of FIG. 25.) In this case, the additional payload may also indicate the earliest time when this Storage Server would want to consider a retry request.
   c) Put Proposal Accepted. (See, for example, the Chunk Accept Message—Proposed Rendezvous structure on left of FIG. 25.) In this case, the additional payload may preferably indicate a time window and data rate reserved for this delivery.

The upper layer will be responsible for processing these responses to determine whether the transfer is required and if so what the membership of the Rendezvous Group should be. For example, the acceptance criteria for an "adequate" number of Accepts (such that a transfer is performed) may be that at least one of the acceptances is from one of the "designated" servers and that a total number of servers in the Rendezvous Group is equal to (or greater than) a desired replication count. The Chunk Source may then initiate a multicast Rendezvous Transfer to the Rendezvous Group at the consensus time.

Rendezvous Transfers

FIG. 26 depicts exemplary encoding structures for rendezvous transfer messages in accordance with an embodiment of the invention. The structures depict a Rendezvous Transfer message without (on the left) and with (on the right) an Arbitrary Chunk ID.

A multicast Rendezvous Transfer message may encode the following information:

1) The Rendezvous Group which may be provided in the "Target Delivery Group" field.
2) The list of Server IDs that should be in the Rendezvous Group. A recipient that is not in this list should leave the Rendezvous Group. This list may be provided in the "List of Delivery Group Members" field.
3) The Content Hash ID of the chunk being put. This may be provided in the "Content Hash ID of Chunk" field. In one implementation, the Content Hash ID may be used to identify the Chunk.
4) The Chunk ID, if different from the Content Hash ID. This may be provided in the "Arbitrary Chunk ID" field.
5) The delivery rate that is planned. A recipient that does not believe it can sustain this rate should leave the Rendezvous Group and explicitly negatively acknowledge the delivery of the chunk (i.e. explicitly indicate that the chunk was not delivered). The delivery rate may be provided in the "Delivery Rate" field.
6) A set of Authentication Tokens for this Chunk. In the context of a new Chunk Put transaction, there will be exactly one Authentication Token. Interpretation and usage of the Authentication Token is not the responsibility of the replicast transport layer. The Authentication Tokens may be provided in the "Remaining Content" field, and the length of these tokens may be provided in the "Length of Tracking Tokens" field.
7) The remaining payload that was not included as unsolicited payload in the original Chunk Put Proposal. This may be provided in the "Remaining Content" field.

Each recipient of the Rendezvous Transfer that is part of a put transaction will either acknowledge successful receipt and processing of the entire chunk with a Payload Acknowledgement (Payload ACK) message, or negatively acknowledge receipt (i.e. indicate failed reception) with a Payload Negative Acknowledgement (Payload NAK). A Payload ACK (or NAK) is also generated in response to a Put Proposal that included an entire chunk payload.

In an exemplary implementation, processing of a received chunk by the upper layer must be complete before the Payload ACK is transmitted. In addition, the received chunk must be persistently stored, or applied and the results persistently stored, before a Payload ACK is sent.

In an exemplary implementation, the Payload ACK may be sent both to the Data Source and to a multicast group of all servers that wish to track the existence of chunks mapped by a row of the Distributed Hash Allocation Table. Such a group may be a specific member of the Multicast Address Set or may be the default multicast address for the Negotiating Group.

An alternative method is to have each recipient of the Chunk Put message send just a unicast Payload ACK to the Chunk Source. The Chunk Source then prepares Relayed ACK messages summarizing one or more received Payload ACKs; these messages are sent to the appropriate multicast group.

The destination group may be the Negotiating Group itself, or it may be a companion multicast address taken from the Multicast Address Set for the Distributed Hash Allocation Table row where that member is designated for Payload ACK messages, either in general or specifically for named chunks.

Payload ACKs and NAKs

FIG. 27 depicts exemplary encoding structures for payload acknowledgement messages in accordance with an embodiment of the invention. Structures for named and unnamed Payload ACK messages are depicted on the left and right, respectively. A structure for a Payload NAK message is depicted in the middle.

The Payload ACK and NAK messages may encode the following information:

1) The Chunk ID that is being acknowledged. In an exemplary implementation, the Chunk ID may be provided in the "Content Hash ID" field, where the Content Hash ID is generated by applying a hash function to the content of the Chunk.
2) If these are implemented, the Name Hash identifier and Unique Version ID for this Chunk. The Name Hash identifier may be implemented as shown in a combination of the "Bucket ID" and "Name Hash ID" fields. The Unique Version identifier may be implemented in the "Unique Version Identifier" field.
3) The status: successful or not. The status may be provided in by the Opcode/Message Type shown of FIG. 23. If the status is unsuccessful, then a specific payload NAK error code may be provided. (See, for example, the Specific Payload NACK Error Code in the Payload NAK Message shown in FIG. 27.) Indicating specific reasons for a negative acknowledgement is useful for diagnostic purposes, but is not necessary for the functionality of the present invention.

4) When successful, the Server ID that now has this chunk stored. The Server ID may be a network address currently assigned to the port or a permanent identifier of the Server independent of current network assigned addresses. In an exemplary implementation, the source address or identifier may be provided in the Request/Notification Source header field in FIG. 22.

When the Payload ACK was only unicast to the Data Source, the Data Source must multicast a Relayed ACK to the Negotiating Group to inform the members of the group of which servers now have this chunk stored. The Data Source may aggregate multiple Payload ACKs for the same chunk into a single Relayed ACK message.

Get Requests

FIG. 28 depicts exemplary encoding structures for get request messages in accordance with an embodiment of the invention. Structures for named and unnamed Chunk Get messages are depicted on the left and right, respectively.

The multicast Chunk Get messages may encode the following information:

1) Identification of the transaction:
   a) A Source ID of the Client or its agent. This may be a network address currently assigned to the port or a permanent identifier of the Client (or its agent) independent of current network assigned addresses. In an exemplary implementation, the source address or identifier may be provided in the Request/Notification Source header field in FIG. 22.
   b) A transaction sequence number. For example, the transaction sequence number may be provided in the "Transaction Sequence #" and "Sub-Sequence #" fields of FIG. 22.
2) Identification of the chunk desired. Depending on the application layer this may take multiple forms. This could be any of the following:
   a) The exact Chunk ID of any chunk that does not have a Name Hash ID. This Chunk ID will typically have been obtained from a metadata chunk that did have a Name Hash ID. The exemplary Unnamed Chunk Get Message shows this case where the chunk is identified by the "Content Hash ID" field in FIG. 28.
   b) The exact Name Hash ID of an Object combined with an optional specification of a desired version. The exemplary Named Chunk Get Message shows this case where the chunk is identified by a combination of the "Bucket Hash ID", "Name Hash ID" and "Unique Version Identifier Range" fields in FIG. 28.
3) The Rendezvous Group for this Get Request. This corresponds to the "Delivery Group" field in FIG. 28.
4) The maximum amount of unsolicited content that may be delivered in each response. This corresponds to the "Maximum Immediate Content Size per Get" field in FIG. 28.
5) A Reception Window when the client will be ready to receive the response. This may be the same (or very similar) information as provided in the Put Accept message. This corresponds to the "Reception Window" (or "Reception Window(s)") field in FIG. 28.
6) A maximum number of auxiliary responses that may be generated for this request. Once a storage server is acknowledged as the responder for this request, it may issue Get requests for up to this many chunks referenced by the main requested chunk. For each of these allowed auxiliary responses a separate reception window may be specified. If not specified the delegated get requests will perform a put transaction to the Rendezvous Group as though it were a Negotiating Group. This corresponds to the "Maximum # of Delegated Gets" field in FIG. 28.

7) Optional additional reception windows that can be used for auxiliary responses.

In the typical case there will be no Additional Target Requests generated. We will therefore first discuss the multicast Get Request without any having been generated, and leave for later the discussion of the case where additional targets are requested.

For a Get Request which specifies delivery immediately or relatively promptly (as defined by system-wide configuration), each Storage Server in the Negotiating Group possessing the chunk requested will attempt to respond to the Get Request as soon as its internal work queues allows it to. However, in accordance with an embodiment of the invention, only the first responding Storage Server will actually completely respond and deliver the requested chunk. As disclosed herein, the mechanisms to ensure that only one response is generated for each Get Request are dependent on the protocol used to implement this collaboration.

Note that an embodiment of the present invention may also define a Unicast Get Request, in addition to a multicast Get Request. The Unicast Get Request would be a Get Request sent to a specific storage server. It is anticipated that such a capability may be largely used for diagnostic purposes, as that there would be no end-user advantage to requesting a chunk be delivered by a specific storage server.

Each designated storage server will attempt to respond to a multicast Get Request with a Get Response message. The Get Responses will be collected either by the client or by the Negotiating Group, resulting in a single source being selected.

Get Responses

FIG. 29 depicts exemplary encoding structures for get response messages in accordance with an embodiment of the invention. Structures for named and unnamed Get Response messages are depicted on the left and right, respectively.

The Get Response messages may encode the following information:

1) A Timestamp indicative of when the response would occur. See "Timestamp when response would occur" field in FIG. 29.
2) The Source ID and IP address of the responding server. The Source ID may be provided in the "ID of storage server" field in FIG. 29. The IP address of the responding server may be provided in the IP header of the packet.
3) Identification of the Multicast Get Request that is being responded to, and which portion of the response this is: the primary content; or the ordinal offset of which referenced chunk is being transferred. The Get Request may be provided in the "Copy of Get Request ID" field in FIG. 29.
4) The Rendezvous Group ID that will be used (which is repeated from the Get request). This may be provided in the "Delivery Group" field in FIG. 29.
5) The rate at which the chunk will be transmitted. This may be provided in the "Delivery Rate" field in FIG. 29.
6) The Content Hash ID of the chunk it will deliver, and if this is a named Chunk, the Name Hash ID and unique version identifier of the chunk. The Content Hash ID may be provided in the "Content Hash ID" field in FIG. 29. The Name Hash ID and unique version identifier may provided in the "Bucket ID," "Name Hash ID" and "Unique Version ID" fields for the Named Chunk Get Response Message in FIG. 29.
7) If the requested chunk is too large, an error message may indicate this problem and specify the actual metadata and payload lengths (see below description of an error Get Response message). Otherwise, any immediate portion of the requested content and the length of the immediate portion may be provided in the "Immediate Content" and "Immediate Content Length" fields in FIG. 29. Note that the entire content requested may consist of: a) the metadata and integrity checking data; and b) the payload. The "Content Length" field in FIG. 29 may indicate the combined length of the entire content requested.

In some embodiments, a storage server may respond with a Content Not Immediately Available message that indicates that it cannot return the content requested until at least a specified time. This would typically be due to migration of the requested chunk to offline storage. Issuing such a response may indicate that the process of moving the requested chunk back to online status has been initiated. However, the request should be re-issued at some time after the time indicated.

In an exemplary implementation, each respondent only sends the first datagram in the response. This response is sent using unsolicited bandwidth. The balance will only be transferred once the specific server has been selected to perform the rendezvous transfer using reserved bandwidth.

Unless the entire response fits in a single datagram, a single responder must be selected to complete the transfer. This may be the primary member of the Negotiating Group offering to deliver the content. This selection is multicast as a Multicast Get Accept message to the Negotiating Group, and the selected server will then begin the transfer. The selected rendezvous transfer is then initiated using reserved bandwidth by the selected storage server to the Rendezvous Group specified in the original Multicast Get Request.

Error Get Response Message

FIG. 30 depicts exemplary encoding structures for an error Get Response message in accordance with an embodiment of the invention. As shown in FIG. 30, an "Error Code for Chunk Get Response Message" may be provided in this error message.

Volunteer Servers

Volunteer Target Servers may issue Additional Target Requests to the Negotiating Group. These messages request that the Volunteer Target Servers be included in the Rendezvous Group as well. When a multicast protocol is used with IGMP (Internet Group Management Protocol) control, this is actually a notification that the additional target will have already joined the Rendezvous Group by the rendezvous time. The additional target merely has to attempt collection of the rendezvous transfer, and saving the chunk if it is received successfully with the payload matching the signature provided. With a multicast protocol not controlled by IGMP, the server selected to perform the Rendezvous Transfer adds the server to the Rendezvous Group as provided by that alternate protocol. Again, the target merely has to collect the chunk on that multicast group, and save the chunk locally if successful. When a unicast chain simulates multicast, the first responding storage server must add the server to the list. This will result in the same chained delivery as described for the put algorithm, except that no Payload ACK message is required.

Expedited Limited Joins

The present disclosure describes a method where multiple servers join a Rendezvous Group and then depart it for each put transaction. Additional targets also join and then depart a Rendezvous Group for each delivery.

The set of servers that is allowed to join these groups dynamically is preferably restricted to those that already belong to an enabling cluster-wide group. This allows embodiments to bypass potentially excessive overhead associated with normal management plane operations.

When IGMP controls group membership, then during a put transaction an individual storage server will:

Join the group after sending a Chunk Put Accept.

Depart the group when the first of the following events occur:

It sends a Payload Ack for this transaction. Note that any storage server has the option to conclude that a transfer will not complete successfully and send a Payload NAK without waiting for the transfer to complete. Detection of gaps in the sequence of received datagrams is one reason for reaching this conclusion.

It receives a Rendezvous Transfer which does not list the storage server as a recipient.

It receiving a Rendezvous Transfer which specifies a transfer rate in excess of what the storage server estimates it will be able to sustain.

It receives a message from that sender that explicitly aborts the Rendezvous Transfer.

Mechanisms for Reliable Multicast Payload Delivery

Although a multicast protocol is typically perceived as an unreliable protocol, the number of congestion drops or misdelivered packets on most wired LANs is extremely small. Since multicasts still have a non-zero probability of not reaching all of the target servers, the Replicast transport protocol provides mechanisms that add reliability to an inherently unreliable protocol, but without the amount of overhead of "reliable" transport mechanisms, such as TCP/IP. These reliability mechanisms are described below under: 1) Chunk Source Responsibilities; 2) Distributed, Reliable Chunk Replication; 3) Requirement for Keep-Alive Service; 4) Lower Layer Transport Protocol; 5) Contention for Unsolicited Bandwidth; 6) Storage Server Queues; and 7) Detection of Non-Compliant Core Network.

1) Chunk Source Responsibilities

One aspect of the "reliability" of the presently-disclosed Replicast transport is that it does not depend on the original chunk source to ensure that all of the copies are made. The chunk source is only responsible for ensuring that the minimum set of replicas are created (with at least one copy on a designated server) before the transaction can be declared complete. Once those copies are guaranteed, then control is returned to the user application that created the object. More replicas will be created, as needed, automatically. Replication of chunks in accordance with the presently-disclosed Replicast transport is an ongoing process that does not necessarily have an end point.

2) Distributed, Reliable Chunk Replication

Now we describe a distributed mechanism for reliability. In an exemplary implementation, each of the Chunk copies keeps a list of the designated destinations for the chunks. (Note that the original source server may be one of these chunk copies that is not a designated copy.) The size of this list is controlled by the replication count for the object, which can also vary by object. If any of the destinations does not yet have a copy of the chunk, then the server holding the chunk wants to replicate the chunk at one or more of the destinations. This distributed replication is an ongoing responsibility of each chunk server. The replication retries are a continuous background task for the storage servers. However, to avoid network congestion, each of the retries may be done on a random interval basis, analogous to the CSMACD collision detection and retry mechanism. In this manner, the replication task may be spread across many different servers and not left to a single source server.

This proclivity to replicate exists for each storage server regardless of its retention of a list of known other replicas.

Retaining such data enables optimization of the replication process, but is not necessary for its correctness.

This same mechanism for performing replication is used whenever servers join or leave the ring of servers. Each chunk server is continuously updating the list of servers that have copies of a chunk. If a ring membership change occurs, caused by a failed server or a partitioned network, there will typically be insufficient replicas of chunks previously assigned to the now missing servers. It will then be the responsibility of all chunk owners to attempt to replicate these chunks. It is not necessary for every server to have an accurate count of the number of replicas. If a given server's estimation is low it will attempt to replicate the chunk, and discover that there are sufficient replicas. Some packets are exchanged, but there is no unnecessary rendezvous transfer.

In preferred implementations, the multicast addressing is used for payload delivery as well as for "unsolicited commands" that carry a payload, rather than negotiating for a time to send the payload. Preferred implementations may ensure that the network switch has been provisioned so that the bandwidth allocated for storage and "unsolicited" traffic is non-blocking up to a pre-determined limit and that the network will not experience congestion as long as the process of reserving payload transmission does not exceed that threshold. This helps to ensure that the "unreliable" multicast is actually quite reliable since it does not run the risk of data loss due to network congestion.

While all commands and payload transfers may be retried, they can avoid the need to retransmit by: protecting the storage traffic from general purpose traffic not complying with these special rules; limiting the bandwidth for unsolicited transmissions to a provisioned rate; limiting the bandwidth for reserved transmissions to a provisioned rate; and only utilizing the reserved bandwidth in accordance with rendezvous agreements negotiated using unsolicited transmissions.

3) Requirement for Keep-Alive Service

The present disclosure generally assumes the deployment of a keep-alive service on the same set of servers. The keep-alive service will promptly detect the departure or loss of contact with any member and have provision for the authenticated joining/re-joining of members. Further, it is assumed that the keep-alive service will determine the round-trip time for each of the storage servers.

4) Lower Layer Transport Protocol

The present disclosure generally assumes a lower layer transport service to provide unreliable datagram service with multicast or unicast addressing. There are also specific congestion control assumptions made about the lower layer protocols. The Replicast transport protocol will function correctly even if these services are not provided, but may exhibit undesirable performance characteristics. For example, the presently-disclosed implementation generally assumes that delivery of unreliable datagram will be effectively drop free if the nodes comply with the provisioned bandwidth limits. The throughput could fall below what would be achieved with conventional solutions if this is not true, but errors will still be detected and properly dealt with.

Specifically the lower layer transport is expected to:

a) Utilize a protected L2 capacity, such as would be provided by the IEEE 802.1 Enhanced Transmission Service (ETS). Specifically, insertion of L2 frames for this class of service must not be allowed from unauthorized sources. L2 frames that are compliant with the negotiated rate for this traffic class must not be at risk of being dropped for lack of network buffering because of L2 frames submitted for another traffic class.

b) Send messages that are each comprised of multiple unreliable datagrams to a small defined group of target addresses where each frame within the message is labeled as to which message it is part of and which portion of the message the frame encodes. Placement of payload from each unreliable datagram should be possible even when received out of order.

c) Be able to define a multicast Rendezvous Group as a subset of an administratively configured group. Methods for implementing multicast addressing include:
  i) Native L2 or L3 multicast addressing capabilities. Both IP and InfiniBand support multicast addressing.
  ii) Broadcasting messages on a virtual network (VLAN, VXLAN, etc.) where only the members of the multicast group have access to the virtual network.
  iii) Use of a custom L4 protocol.

d) Be able to define a multicast Rendezvous Group as a subset of another group created by this transport service.

e) Additionally, take other actions to prevent drop of L2 frames due to temporary network congestion, such as IEEE 802.1 Priority Flow Control (also known as "Per Priority Pause").

Additionally, the receiving stack should be able to discard packets that are duplicates of content already provided to the storage layer.

On IP networks, both the UDP and SCTP transport layers can be used. UDP is the preferred embodiment because it is simpler. SCTP adds multi-homing and multi-pathing, but does so at the expense of needing to maintain reliable associations between SCTP endpoints. On InfiniBand networks, the Unreliable Datagram (UD) transport would be the preferred implementation.

The transport layer is also traditionally responsible for ensuring error free delivery. The presently-disclosed technique assigns that responsibility to the storage layer, which validates the Content Hash ID on all transfers.

One feature of the disclosed transport layer is to only enable allowed traffic. L2 frames for the storage traffic class may only be accepted from authorized end stations. To preserve network security, data sources may only create multicast groups whose membership is a subset of a pre-existing group. Network administrators frequently must support multiple different groups of users, frequently called tenants, on a single network. The service providers must be able to ensure each tenant that there their traffic will not be delivered to ports controlled by other tenants. Network administrators typically need to configure port groups so that network traffic for different tenants cannot mix without going through a router that enforces filtering rules.

There are three approaches to providing the desired transport services:

a) Use existing multicast protocols such as IP multicasting and the Internet Group Management Protocol (IGMP). This approach has the benefit of being standards based, but may require an implementation to impose a minimum delay before payload transmission to allow for the latency required by the IGMP protocol.

b) Use a custom control plane that is optimized to establish existing data-plane control data to use multicast addressing and/or VLANs to achieve the desired group forwarding.

c) Use a custom L3 routing protocol to establish the desired destinations for each packet. The custom L3 routing would dictate which L3 routers each packet was to be delivered to, and the full set of L2 destinations that each router must deliver the packet to.

With the standard IGMP approach, each host may join or leave any multicast group, identified by a multicast IP address. IP datagrams sent to a multicast IP address will be best effort delivered to all members of the group.

The IGMP method requires each target to control its membership in each group. The other solutions involve customizing other methods already supported by network elements for delivering frames to a controlled set of destination links. For all of these methods, the sender must first invoke a designated module to reconfigure the switch forwarding tables as required. Methods for implementing this include, but are not limited to, OpenFlow modules and vendor-specific Switch control plane plugins.

Alternatively, a custom control plane can directly edit existing data-plane forwarding control data to effectively emulate multicast delivery with sender or push based control. This solution works when the forwarding elements have updatable behavior. This can include a custom control-plane module, such as defined by Arista Networks of Santa Clara, Calif. for their switches, or by the Open source OpenFlow standard.

The first custom control plane method is to define a Port Group on an actual or virtual network switch. Any broadcast message sent on one of those virtual ports will be delivered to all other virtual ports of the group. Port Groups are typically limited to ports on a single switch. When the ports are on multiple switches, some form of packet or frame labeling is typically required.

One method of doing so is the 802.1 Virtual LAN (VLAN). Ethernet frames tagged with a VLAN are only forwarded to ports belonging to that VLAN and to switches as needed to reach those ports. Any broadcast message sent from one of the virtual ports will be delivered to all other virtual ports in the VLAN.

There are other protocols which that provide the same functionality as a VLAN, but without the limitation on the number of VLANs. One example of such as protocol is the VXLAN (Virtual eXtensible Local Area Network) protocol.

The last method is to define a custom L3 header which that establishes both the set of L3 routers that this packet must be delivered to, and then the L2 destinations at each of those destinations.

5) Contention for Unsolicited Bandwidth

The bandwidth reserved for unsolicited transmissions cannot be guaranteed to be adequate for a spike in demand. With the reserved bandwidth there will be at most one participant attempting to transmit to any given target at any given time. However, the capacity reserved for unsolicited transmissions is based on an estimate, not on reservations. Estimates can be low. Therefore, collision drops are possible.

The L2 network may be configured to use technique such as Priority Flow Control (PFC) to minimize drops caused by very short over-demand on the unsolicited capacity. Most L2 networks will allow traffic to exceed the reserved rate for unsolicited traffic provided that it does not require dropping frames from non-storage traffic. These techniques can make rare drops caused by over-subscribing of the unsolicited capacity even more rare, but they cannot totally eliminate the risk.

Therefore, all unsolicited requests are acknowledged. An unanswered request is retransmitted. Because each unsolicited request is uniquely identified by its source and a sequence number from that source, all recipients of a retransmitted request can recognize it as one they have previously processed (which can happen when it was their response that was lost, rather than the original request). Redundant requests can be processed by replaying responses from a response cache.

Even with the potential need to retransmit requests and responses, the presently-disclosed transport protocol can outperform conventional solutions using TCP/IP or other reliable point-to-point transports. A spike in the number of requests would have also produced a spike in the number of connection requests in a TCP/IP solution. The TCP/IP SYN requests (to establish connections) would have failed just as often, and needed to be retried as well. While the retries would have been from the kernel, rather than the application layer, there would still need to be more round-trips with a reliable transport.

With the presently-disclosed transport protocol, exchange of unsolicited messages requires two messages. With reliable point-to-point transports there would need to be three or four packets required to establish the reliable connection, then the exchange of application layer messages, following by an eventual TCP tear-down of the connection.

The network should be configured so that the buffering available for unsolicited requests in both the forwarding elements and the receiving nodes is sufficient for all but the most extreme peaks of traffic. Well-known conventional solutions can make these exchanges just as reliable as reliable transports with less demand on network resources.

The present disclosure also relies upon the Replicast transport layer pacing its upper layer in some manner that limits the aggregate number of unsolicited datagrams to comply with the available buffering. The most minimalistic implementation of this is simply applying an Aloha-style random back-off for retransmission of unacknowledged request datagrams. When network congestion is high more requests will be unacknowledged, which is sufficient information to spread the retransmission over a wider time span. This effectively lowers the aggregate transmission rate.

However, it should be understood that the method used to pace the upper layer is not constrained to a conventional delay on the transmission of an already submitted datagram. Embodiments of the present invention may use a variety of techniques to refine the estimation of contention for the unsolicited bandwidth. Furthermore, this pacing information may be simply shared with the upper layer so that the upper layer may select what datagrams it wants to submit. There is no constraint to merely time the delivery of already submitted datagrams.

6) Storage Server Queues

In an exemplary implementation, the following types of storage traffic may be treated differently:

a) Messages carrying Commands and Responses would use an Unsolicited traffic class and be queued to a short command/response queue on each Storage Server. Obtaining an Ethernet traffic classes for both Unsolicited and Solicited storage traffic will not always be feasible. In many embodiments, a single Ethernet traffic class will be used combined with assigning UDP port numbers to either Unsolicited or Solicited inbound queues.

b) Messages carrying Solicited Payload could use a Solicited traffic class and be steered to a payload queue on each Storage Server, or be differentiated solely by the destination UDP port number.

7) Detection of Non-Compliant Core Network

The presently-disclosed protocol relies on the core network to deliver multicast packets only to the edge links identified by the multicast group as currently tailored. An implementation may monitor this compliance, preferably independently but possibly as part of processing incoming Ethernet frames. Excessive delivery, such as would be caused by inadequate forwarding tables resulting in excessive flooding of Ethernet frames out of all non-originating ports, indicates that use of the presently-disclosed protocol should be suspended with conventional TCP-like protocols being used instead.

Alternative Implementations and Special Notes

This section describes alternative implementations and other aspects of the presently-disclosed invention.

1) Variations in Participation by Negotiating Group Members

The Negotiating Group identifies the set of storage servers that should receive get or put requests for those chunks. However, not all members of this group need necessarily be equal.

For example, when IGMP is used to control multicast groups, storage servers that have access to a parent VLAN may be allowed to join the multicast group and thereby become an "associate" member of that group. These "associate" members will receive Put Proposals and Get Requests, but they are not relied upon to provide long-term persistent storage of chunks. They are not on the designated list for the group, and, therefore, will not count towards certain minimal retention requirements.

With sender-controlled memberships, these additional members would be listed as special members of the Negotiating Group. This will require representation in whatever table or datastore used by the upper layers to selected Negotiating Groups.

2) Simulated Multicast Rendezvous

Alternative embodiments may implement a rendezvous transfer using chained point-to-point transfers. These transfers would still be done with a nominally unreliable transport, such as UDP/IP or InfiniBand Unreliable Datagrams (UD). To implement a unicast chain delivery, each storage server will do the following steps:

a) Initiate a unicast point-to-point transfer (typically UDP/IP) to a port or service indicator on the Client/Agent. The client, or agent, will explicitly send a delivery abort response back to the sender for all but one of the transfers. Delivery of the chunk will be discontinued when an abort is received. Implementations may choose to slightly delay the second frame of a response to allow any abort message to be received.

b) Otherwise, deliver the chunk to the Client/Agent over the point-to-point transfer with a Target list consisting solely of the client/agent.

3) Delegated Get Request

In one embodiment of the present invention, the process of getting an object is further optimized for distributed object storage systems which store metadata for a version of an object separately from the payload. The root chunk of an object (also called the "version manifest" or metadata) contains references to the chunks/blocks.

In a default embodiment, the issuer of a Get Request would obtain the version manifest chunk, and then issue Get Requests for the referenced payload chunks. This pattern is used in both pNFS (parallel NFS) and the Hadoop Distributed File System (HDFS).

In an optimized embodiment, the storage server delivering the version manifest chunk may originate Get Requests for a specific number of the initial payload chunks referenced by the version manifest. These requests specify the originator of the Get Request as the target by using the same Rendezvous Group.

Each L5 message for these auxiliary deliveries specifies a sub-sequence number that allows the Chunk Sink(s) to determine which payload chunk is being delivered. The original Get Request specifies the maximum number of auxiliary deliveries it will accept and a delivery window for each.

4) Alternative Delivery Patterns

There are several patterns detailed in this disclosure where the same information is relayed to bother the Rendezvous Group and the Negotiating Group. It should be understood that in all cases any of the following implementations are equally valid:

The information is sent to the Rendezvous Group. The transaction originator then relays this information to the Negotiating Group either as an extra message, which may consolidate multiple responses, or by including this information in the next message it would send to the same Negotiating Group.

The information is sent to the Negotiating Group, which then determines what the consensus is before sending a single response to the Rendezvous Group.

The information is sent to both groups in parallel. This option is particularly attractive with a custom L3 protocol.

The information is sent to both groups in parallel under specific scenarios where the implementation has determined that the improved latency offered by dual forwarding this specific information justifies the additional network traffic. Such determinations may be dependent on implementation or even site-specific factors.

5) Alternative Indefinite Reservations

In an alternative embodiment of the present invention, it may be advantageous to recognize when the storage cluster consists of a relatively small number of storage servers and a similarly small number of clients.

When this condition is recognized it may be advantageous for storage servers to grant permanent bandwidth reservations to the clients, and credits for creation of chunks up to a certain aggregate size.

When such a reservation is granted, the clients would be able to dispense with making a Put Proposal, simply assume the Rendezvous Group was identical to the Negotiating Group and immediately put the chunk using the unsolicited protocol.

When the number of storage servers increased the system would shift to normal operations and require the handshake to reserve protocol.

Upper Layer Decision Making

The protocol disclosed includes decision making performed by the upper layer. This is the layer above the layer of the present invention, which is a transport layer. In one embodiment, the upper layer is a storage layer.

For get transactions, the upper layer (of the client in a client consensus embodiment, or of the servers in the negotiating group in a cluster consensus embodiment) is responsible for evaluating all Get Responses to determine which offering server will be the source of the transfer, and the time of the transfer (within the range offered). The source and time of the transfer may then be provided in a Get Accept message. In one simple embodiment, the transfer source may be selected from the offering servers by a randomized selection technique. In another embodiment, the transfer source may be selected from the offering servers by a procedure which takes into account earliest time for transfer indications obtained via the Get Responses and may also take into account the location of the offering servers within the network topology. In one example, offering servers closer to the requesting client in the network topology may be favorably weighted.

For put transactions, the upper layer of the servers in the negotiating group is responsible for evaluating all Put Proposals to determine whether a rendezvous transfer is needed, and if so, at what time and at what rate. The time and rate of the transfer, if needed, may then be provided in a Rendezvous Proposal message to the initiating client (in the client consensus embodiment) or to the other servers in the negotiating group (in the cluster consensus embodiment).

The upper layer is also responsible for determining when each server will offer to do a receive or transmit. This determination may start with the best estimate that the server can make as to the earliest time when the server can be confident that the transfer can occur. Determining the best estimate for the earliest time may involve scheduling of network bandwidth on the local links for the server (to find the earliest time when the link will be free for reception or transmission of the chunk) and of its input/output to persistent storage (since there is little benefit of receiving data that cannot be written to disk until much later because other writes are already committed and/or because of required head movement for traditional hard disk drives).

The algorithm used to make these scheduling estimates may be dependent on the relative speeds of the network and storage devices, and on the resources available to make the estimations. Embodiments of the present invention do not necessarily require any specific algorithm be implemented, although it is preferable that the estimation be as good as possible with the available resources.

A comparison can be made with a free market system. Approaching an optimum balancing of supply versus demand is not dependent on every participant analyzing the market perfectly, just that generally participants are trying to optimize their decisions.

Example Computer Apparatus

Figure 31:
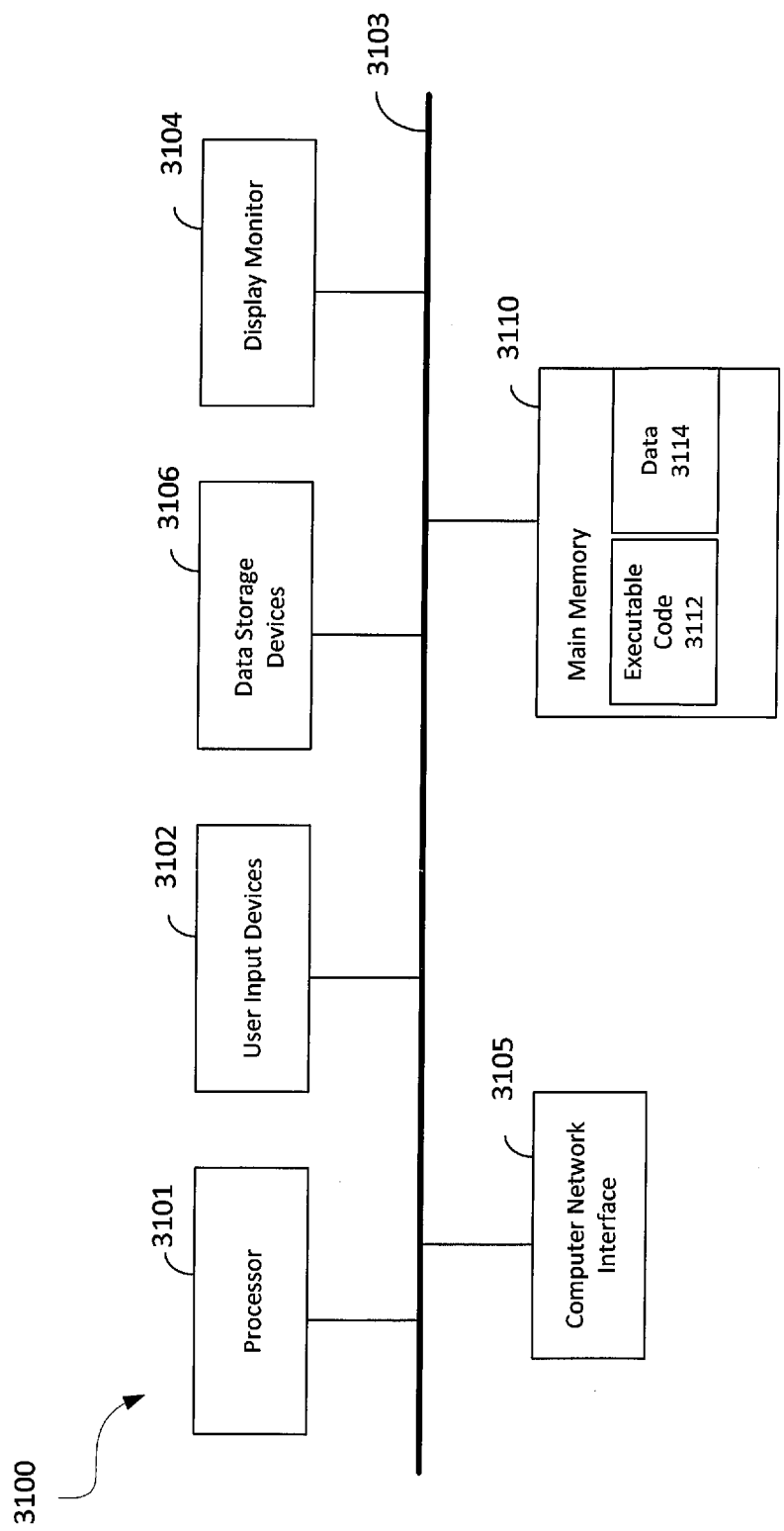
FIG. 31 depicts a simplified example of a computer apparatus which may be configured as a client or a server in the system in accordance with an embodiment of the invention.

FIG. 31 depicts a simplified example of a computer apparatus 3100 which may be configured as a client or a server in the system in accordance with an embodiment of the invention. This figure shows just one simplified example of such a computer. Many other types of computers may also be employed, such as multi-processor computers.

As shown, the computer apparatus 3100 may include a processor 3101, such as those from the Intel Corporation of Santa Clara, Calif., for example. The computer apparatus 3100 may have one or more buses 3103 communicatively interconnecting its various components. The computer apparatus 3100 may include one or more user input devices 3102 (e.g., keyboard, mouse, etc.), a display monitor 3104 (e.g., liquid crystal display, flat panel monitor, etc.), a computer network interface 3105 (e.g., network adapter, modem), and a data storage system that may include one or more data storage devices 3106 which may store data on a hard drive, semiconductor-based memory, optical disk, or other tangible non-transitory computer-readable storage media 3107, and a main memory 3110 which may be implemented using random access memory, for example.

In the example shown in this figure, the main memory 3110 includes instruction code 3112 and data 3114. The instruction code 3112 may comprise computer-readable program code (i.e., software) components which may be loaded from the tangible non-transitory computer-readable medium 3107 of the data storage device 3106 to the main memory 3110 for execution by the processor 3101. In particular, the instruction code 3112 may be programmed to cause the computer apparatus 3100 to perform the methods described herein.

CONCLUSION

The presently-disclosed transport protocol allows the set of storage servers providing persistent storage for a chunk to be selected from those that can store the chunk most promptly, rather than arbitrarily selecting a set of storage servers without regard for network traffic or server workloads.

In conventional solutions, selecting storage servers based upon their current loads was limited to systems with a centralized metadata system, such as HDFS and pNFS. Other previous solutions use consistent hashing algorithms to eliminate the central bottleneck, but are then incapable of considering dynamic factors such as queue depth.

The presently-disclosed transport protocol allows the Chunk Source to select the optimum set of storage servers to take initial delivery of a chunk from amongst the Chunk Put Accept responses collected to a multicast Put Proposal. Centralized metadata solutions can only perform this optimization to the extent that the central metadata server is aware of the resource status of every storage server in the cluster. Existing consistent hash algorithms can only adjust boundaries for longer term changes in the distribution. Any change in the distribution of chunks requires moving previously committed chunks. Only major changes in the distribution can justify the migration costs of adjusting the distribution.

The presently-disclosed transport protocol allows the initial source of a chunk to select the initial Rendezvous Group. In selecting the initial Rendezvous Group, the source server has many options to influence the members of the group. Some of the considerations may include, spreading replicas across failure domains, selecting destinations that have the largest amount of free space, destinations that have a best rating (combination of CPU power and memory space available, e.g. Windows Experience Index) as well as other factors that can vary dynamically, including the speed, number and/or cost of the link(s) between the source and the sink.

The presently-disclosed transport protocol also allows storage servers with excess capacity and currently low work queues to volunteer to provide additional replicas of chunks. In fact, many storage systems have the notion of "hot standby" drives that remain powered up, but idle, to step in when an existing drive fails. With an exemplary implementation of the present invention, these hot stand-by drives can be used to perform a performance enhancing "volunteer" duty to hold volatile extra copies of objects. Clients can find these additional replicas using the Negotiating Group. The Negotiating Group also enables collaboration within the group can be found by clients seeking those chunks and/or when replication of those chunks is required due to the loss of an existing storage server (or the additional of a new storage server).

The presently-disclosed transport protocol also allows for dynamic adjustment of a Distributed Hash Allocation Table to dynamically load-balance assignment of responsibilities among the storage servers. The present disclosure also allows for alternate strategies, such as holding new servers in reserve to replace failed or to offload overloaded servers. Prior solutions could only provide this type of flexible resource assignment by centralizing the function of the metadata server.

The presently-disclosed transport protocol also provides for improved utilization of network bandwidth and buffering capacities. Bandwidth capacities may be quoted for network elements as though they were reserved. However, this is not how network elements actually operate. Buffers are not pre-enumerated for different classes of service. They come from a common pool. Stating that the network element has a queue for up to 40 Ethernet frames in Class X does not mean that there are 40 buffers pre-allocated for that purpose. Rather, it means that after 40 frames are queued for Class X, further frames for Class X may or will be dropped, and that no frames for a different Class that is below its quota will be dropped because an excessive number of frames for Class X were queued.

This can be thought of as a reservoir with controlled ingress and egress rates. As an analogy, it may be known that, in aggregate, 30% of the water in the reservoir came from river W, but that does not mean that it is easy to find the specific drops in the reservoir.

With an exemplary implementation of the presently-disclosed transport protocol, the time that copies of a given chunk will be in network element buffers is greatly reduced. With unicast protocols, a buffer will be required for the reception time, queued time and transmit time for each of the three copies. In contrast, with the presently-disclosed protocol, a single buffer will only be held for the reception time, the longest queue time of the three copies, and the transmit time. While this will be more than one-third of the time that buffers will be held for the unicast protocols, it is still a considerable improvement with a replication count of three. Higher replication counts produce even more dramatic improvements.

Even if there are no changes in the class of service traffic shaping for any of the Ethernet priorities, this now unused buffer capacity can enable more Unsolicited and more non-storage packets to be successfully delivered over the same local area network than could have been delivered had a unicast delivery strategy been used. Less buffering also means prompt transmission, which will improve average delivery times.

In summary, the presently-disclosed transport protocol provides for effectively reliable delivery of multicast chunks (and associated tracking data) using unreliable datagrams. It does this by effectively eliminating the risk of congestion-based drops. It extends enhanced L2 techniques, such as IEEE 802.1 DCB (DataCenter Bridging) protocols, by dynamically allocating edge bandwidth between unsolicited and solicited transfers. Each transfer is paced so as to avoid sustained over-subscription of network capacity, which the L2 techniques such as DCB cannot solve.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

GLOSSARY OF TERMS

The following definitions are presented to illuminate specific embodiments of the present invention, but they are not necessarily meant to limit the scope of the invention.

Better Response—A Better Response for the same chunk is "better" if the combined Timestamp and Source fields represent an "earlier" response, or if the version of a chunk is later (more recent).

Chunk—A "chunk" is typically a description for a subset of an object. That is, an object is typically split into multiple chunks. In other object storage systems that we have studied, the chunks of an object and the metadata of an object are treated as two separate types of data and are treated differently and stored differently. In accordance with an embodiment of the present invention, the metadata can be accessed as either metadata or as a chunk. Thus, the term chunk can refer to any subset of the metadata or data for a version of an object, without regard to how uniform or divergent the handling of metadata is from data in a specific storage system.

Chunk ID—The identifier of a Chunk which can never refer to different chunk payload for a period that is at least twice as long as the lifespan of a chunk. This is the Content Hash ID in an exemplary embodiment, but it can be an Arbitrary Chunk ID supplied by a centralized metadata system (such as an HDFS namenode) in some embodiments of the present invention.

Chunk Put—A Chunk Put is an operation or a PDU which transfers the payload and metadata of a chunk to the Rendezvous Group. See 'Chunk Put Proposal' for an explanation of how these terms may be viewed either as an operation or as a PDU.

Chunk Put Proposal—An operation, or a PDU (depending on which layer the reference is used in) which proposes a Chunk Put using reserved bandwidth. When discussing the algorithm for assigning persistent storage responsibility, this is an abstract operation. When discussing the specific protocol used to implement that collaboration, this is a PDU.

Content Hash ID—The Content Hash ID is a cryptographic hash (typically SHA256 or other suitable hash) that represents a digest of the chunk payload (after optional compression).

Designated Servers—In a preferred embodiment, the set of servers responsible for the long term storage of a chunk. The designated server list is a subset of the Negotiating Group.

Distributed Hash Allocation Table—A table used in the preferred embodiment implemented on multiple servers. It maps a range of Hash IDs to a Multicast Address Set and an enumerated list of designated members. When non-IGMP transport protocols are used it would also enumerate other classes of members.

Gateway Servers—In a preferred embodiment, the set of servers responsible for making special replications of chunks that do not get added to the Chunk's replication count. These servers are used as the front-end or gateway to either archival storage or as gateways to a remote cluster that shares knowledge of assets. The gateway server list is a subset of the Negotiating Group.

Multicast Address—A Multicast Address is a network address that enables a message to be sent to a group of destination endpoints. In most embodiments of the present invention, this will be an IP multicast address.

Multicast Address Set—A set of Multicast Addresses that enables a message to be sent to all members of a matching group. The set can be represented as a two-dimensional array. One dimension represents different parallel networks that can reach the same storage servers but over distinct network resources. For each physical network that the storage servers are attached to, one of the multicast addresses in a Multicast Address Set is to be used. The second dimension allows definition of subsets of the Negotiating Group. For example a second multicast address can be created for each Negotiating Group that is subscribed by servers wishing to receive notification of new named chunks. In the preferred embodiment, the Multicast Address Set is assigned to a Distributed Hash Allocation Table using a configuration object.

Multicast Group Address—A Multicast Group Address is a single address which will direct a packet to be delivered to a group of end stations. Multicast addresses are defined for both Layer 2 and Layer 3 protocols. Ethernet is the primary example of a layer 2 protocol, while IP is the primary example of a Layer 3 protocol.

Negotiating Group—The Negotiating Group is the group of storage servers that are collectively assigned responsibility to provide access to Chunks for a specific range of Hash IDs. Typically the Designated Group is found by searching the Distributed Hash Allocation Table. Each range of Hash IDs, which corresponds to a row in the Distributed Hash Allocation Table, has a Multicast Address which can be used to address all members of the group. Alternatively, a central metadata system (such as an HDFS namenode) can specify the membership of a Negotiating Group. The present invention allows virtually unlimited scaling of a storage cluster because no matter how large a cluster is, only the members of the Negotiating Group are relevant to the operations on any specific chunk. Doubling the size of the cluster only requires doubling the number of Negotiating Groups.

Notification Servers—In a preferred embodiment, the set of servers that have requested notification when Chunks with a matching Hash (e.g. an Object) have been updated. These servers are most office client servers or proxies that are on a notification queue that will provide information on updates to previously created Chunks. In the preferred embodiment, this is most frequently used for the hash of the name of an object. The notification server list is a subset of the Negotiating Group.

Payload ACK—A Payload ACK is a PDU sent by the recipient of a Chunk Put message to indicate whether the payload was received successfully.

PDU (Protocol Data Unit)—An encoding of a message used to communicate between peers at the same layer, as in an OSI layered model of network communications.

Put Accept—A response to a Chunk Put Proposal that specifies whether the storage server already has the identified chunk, or if not when it could receive it, or when it cannot accept the chunk at this time.

Reception Window—The time period (in microseconds) after the time of the Get Request that contains the Reception Window, when the Requestor will desire delivery of the Get Request.

Relayed ACK—A relayed ACK is a PDU sent from the Chunk Source to the Designated Super-Group which relays one more received Payload ACKs so that every member of the Designated Super-Group can be aware of exactly how many replicas of a specific chunk have been successfully created.

Rendezvous Group—The group of storage servers selected to receive a replica of a chunk during a chosen rendezvous of chunk transmission.

Rendezvous Time Window—A Rendezvous Time Window is a proposal for, or consensus upon, a time window for the delivery of a specific chunk to a Rendezvous Group. This includes a start time, duration and a maximum bandwidth.

Rendezvous Transmission—A rendezvous transmission is a transmission of Chunk content that is multicast to a Rendezvous Group. This is a step in either a get or a put of a chunk.

Relayed Unicast Delivery—Relayed Unicast Delivery is the simulation of a multicast delivery in a network environment where multicast is not allowed by network policies. With Relayed Unicast delivery, the packet is delivered once by the originator to the first member of the Rendezvous Group using a Unicast protocol such as TCP/IP (virtual circuits). Each recipient of the chunk with the Rendezvous Group will remove their server id from the list of recipients and then forward the chunk and recipient list to the next reachable Service Level Agreements—Contractual arrangements between hosting or Storage as a Service (SAAS) companies and their customers that guarantee the retention of data and the response time for the availability of data.

Unsolicited Commands—Commands such as get or put that have an urgent and small request. They will typically include the payload as part of the command rather than proposing that the payload is sent and waiting for round trip times to confirm the delivery request, the payload is included with the command. Unsolicited commands are sent using unsolicited bandwidth. Unsolicited bandwidth is reserved stochastically for an anticipated probable maximum, rather than being reserved for specific transfers.

Version Manifest Chunk—A chunk which holds the root of metadata for an object and which has a Name Hash ID. The term used for such chunks in the Nexenta CCOW storage system is Version Manifest.

Volunteer Servers—In a preferred embodiment, Volunteer Servers are those servers that volunteer to make extra copies of a Chunk, in anticipation that the Chunk will be requested in the near future. Analogous to the Adaptive Replacement Cache which is used in ZFS storage, in one embodiment the Volunteer servers use a combination of Most Recently Used (MRU) and Most Frequently Used (MFU) Chunks to determine which chunks are maintained in their local storage. The copies of Chunks that are placed in these servers are not counted as Designated Copies. The Chunks in these servers are normally held for relatively short periods of time and in preferred embodiments can be deleted almost at will. The only exception to this is, if the Chunk has not yet had a sufficient number of Designated copies committed to long-term storage

What is claimed is:

1. A method of putting a chunk of payload data in a cluster of storage servers using unreliable datagrams, the method comprising:

performing a cryptographic hash of the chunk to generate a content hash identifier for the chunk;

selecting a negotiating group for the chunk by mapping the content hash identifier to a distributed hash allocation table;

multicasting a put proposal from an initiating client to the storage servers in the cluster that are in the negotiating group for the chunk;

in response to the put proposal, unicasting a put accept response from each of the storage servers in the negotiating group to the initiating client;

evaluating the put accept responses by the initiating client to determine the storage servers in the negotiating group that are members of a rendezvous group; and multicasting the payload data of the chunk from the initiating client to the storage servers that are members of the rendezvous group so as to perform a rendezvous transfer.

2. The method of claim 1, wherein the put accept responses are evaluated by the initiating client to determine whether the rendezvous transfer is to be performed based on a number of existing replicas of the chunk indicated by the put accept responses.

3. The method of claim 1, wherein the put accept responses are evaluated by the initiating client to determine a designated time and a designated transmission rate for the rendezvous transfer.

4. The method of claim 1, wherein the rendezvous group is a non-empty subset of the negotiating group.

5. A method of getting a chunk of payload data from a cluster of storage servers using unreliable datagrams, the method comprising:

performing a cryptographic hash of the chunk to generate a content hash identifier for the chunk;

selecting a negotiating group for the chunk by mapping the content hash identifier to a distributed hash allocation table;

multicasting a get request from an initiating client to the storage servers in the cluster that are in the negotiating group for the chunk;

in response to the get request, unicasting a get response from each of the storage servers in the negotiating group to the initiating client;

evaluating the get responses by the initiating client to determine a designated storage server that is to perform a rendezvous transfer to a rendezvous group;

multicasting a get accept from the initiating client to the negotiating group, wherein the get accept indicates the designated storage server; and performing the rendezvous transfer by sending the payload data of the chunk from the designated storage server to the rendezvous group.

6. The method of claim 5, wherein the rendezvous group includes at least the initiating client.

7. The method of claim 5, wherein the rendezvous group further includes a storage server that volunteers to store the chunk.

8. A system that stores a chunk of payload data using unreliable datagrams, the system comprising:

a cluster of storage servers;

a network of non-blocking switches communicatively interconnecting the storage servers of the cluster; and an initiating client comprising a client system that communicatively interconnects to the network, wherein the initiating client multicasts a put proposal to the storage servers of the cluster that are in a negotiating group for the chunk, the negotiating group being selected by mapping a content hash identifier to a distributed hash allocation table, wherein the storage servers in the negotiating group unicast put accept responses to the initiating client, wherein the initiating client evaluates the put accept responses to determine the storage servers in the negotiating group that are members of a rendezvous group, and wherein the initiating client performs a rendezvous transfer by multicasting the payload data of the chunk to the storage servers that are members of the rendezvous group.

9. The system of claim 8, wherein the put accept responses are evaluated by the initiating client to determine whether the rendezvous transfer is to be performed based on a number of existing replicas of the chunk indicated by the put accept responses.

10. The system of claim 8, wherein the put accept responses are evaluated by the initiating client to determine a designated time and a designated transmission rate for the rendezvous transfer.

11. The system of claim 8, wherein the rendezvous group is a non-empty subset of the negotiating group.

12. A system that retrieves a chunk of payload data using unreliable datagrams, the system comprising:

a cluster of storage servers;

a network of non-blocking switches communicatively interconnecting the storage servers of the cluster; and an initiating client comprising a client system that communicatively interconnects to the network, wherein the initiating client multicasts a get request to the storage servers in the cluster that are in a negotiating group for the chunk, the negotiating group being selected by mapping a content hash identifier to a distributed hash allocation table, wherein, in response to the get request, a get response is unicast from each of the storage servers in the negotiating group to the initiating client, wherein the get responses are evaluated by the initiating client to determine a designated storage server that is to perform a rendezvous transfer to a rendezvous group, wherein a get accept is multicast from the initiating client to the negotiating group, wherein the get accept indicates the designated storage server, and wherein the rendezvous transfer is performed by the designated server sending the payload data of the chunk to the rendezvous group.

13. The system of claim 12, wherein the rendezvous group includes at least the initiating client.

14. The system of claim 12, wherein the rendezvous group further includes a storage server that volunteers to store the chunk.

15. A method of storing a chunk within a cluster of storage servers using unreliable datagrams, the method comprising:

multicasting a put proposal by an initiating client to storage servers of a negotiating group, wherein the negotiating group is determined by mapping a content hash identifier to a distributed hash allocation table;

receiving unicast proposal responses from the storage servers in the negotiating group by the initiating client;

determining a rendezvous group of storage servers by the initiating client using the unicast proposal responses; and multicasting a payload of the chunk by the initiating client to the rendezvous group.

16. A method of storing a chunk within a cluster of storage servers using unreliable datagrams, the method comprising:

receiving a multicast put proposal from an initiating client by a storage server of a negotiating group, wherein the negotiating group is determined by mapping a content hash identifier to a distributed hash allocation table;

unicasting a proposal response from the storage server in the negotiating group to the initiating client in response to the multicast put proposal; and receiving a multicast payload of the chunk that is multicast from the initiating client to a rendezvous group that includes the storage server, wherein the rendezvous group is determine by the initiating client.

17. The system of claim 8, wherein at least a portion of the payload data is delivered using bandwidth from a reserved traffic class, and the put proposal specifies a maximum delivery rate.

18. The method of claim 1, further comprising:
validating successful transfer of the chunk using the content hash identifier.

19. The method of claim 5, further comprising:
validating successful transfer of the chunk using the content hash identifier.

20. The method of claim 5, wherein the chunk is an named chunk, and the get request comprises a name hash identifier to identify the chunk, and the get response comprises both the name hash identifier and the content hash identifier.

21. The method of claim 5, wherein the chunk is an unnamed chunk, and both the get request and the get response each comprises the content hash identifier to identify the chunk.

* * * * *